(12) United States Patent
Inoue et al.

(10) Patent No.: US 7,159,229 B2
(45) Date of Patent: Jan. 2, 2007

(54) DISK CARTRIDGE

(75) Inventors: Naoki Inoue, Kanagawa (JP); Susumu Shibagaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 427 days.

(21) Appl. No.: 10/819,575

(22) Filed: Apr. 7, 2004

(65) Prior Publication Data

US 2004/0202064 A1 Oct. 14, 2004

(30) Foreign Application Priority Data

Apr. 11, 2003 (JP) ............................ 2003-107377

(51) Int. Cl.
*G11B 23/03* (2006.01)
(52) U.S. Cl. .................................... 720/728
(58) Field of Classification Search ............... 360/133; 720/728, 741
See application file for complete search history.

(56) References Cited

U.S. PATENT DOCUMENTS

| | | | |
|---|---|---|---|
| 5,940,550 A | 8/1999 | Plickert et al. | |
| 6,307,831 B1 * | 10/2001 | Miyazaki et al. | 720/728 |
| 6,376,765 B1 | 4/2002 | Wariishi et al. | |
| 6,586,670 B1 | 7/2003 | Yoshikawa | |
| 6,602,998 B1 | 8/2003 | Kobuke et al. | |
| 6,754,167 B1 * | 6/2004 | Nakashima | 720/728 |
| 6,762,990 B1 * | 7/2004 | Yoshida et al. | 720/728 |
| 6,766,817 B1 | 7/2004 | Silva | |
| 6,911,595 B1 | 6/2005 | Yoshikawa et al. | |
| 2002/0015881 A1 | 2/2002 | Nakamura | |
| 2002/0031080 A1 | 3/2002 | Inoue | |
| 2003/0183271 A1 | 10/2003 | Ikeda et al. | |
| 2004/0251508 A1 | 12/2004 | Tomita | |
| 2005/0218467 A1 | 10/2005 | Tomita | |
| 2005/0224112 A1 | 10/2005 | Tokita et al. | |
| 2006/0048812 A1 | 3/2006 | Tomita | |
| 2006/0084257 A1 | 4/2006 | Tokita | |
| 2006/0107994 A1 | 5/2006 | Morooka et al. | |
| 2006/0112988 A1 | 6/2006 | Morooka | |

(Continued)

FOREIGN PATENT DOCUMENTS

EP 1 058 260 A1 12/2000

(Continued)

OTHER PUBLICATIONS

Uchida, Satoshi, "Application of Titania Nanotubes to A Dye-Sensitized Solar Cell," Electrochemistry, Jun. 2002, vol. 70, No. 6, pp. 418-420.

(Continued)

*Primary Examiner*—Allen Cao
(74) *Attorney, Agent, or Firm*—Wolf, Greenfield & Sacks, P.C.

(57) ABSTRACT

Four positioning holes or grooves of the first to the fourth positioning portions are formed on a shell as positioning portions to a disk drive apparatus. When two directions perpendicular to the thickness direction of a disk-shaped recording medium are designated as an X direction and a Y direction, the first and the second positioning portions are formed at the same position in the X direction, and the third and the fourth positioning portions are formed at the same position in the X direction, and further the first and the third positioning portions are formed at the same position in the Y direction, and still further the second and the fourth positioning portions are formed at the same position in the Y direction. When the disk cartridge is located to the disk drive apparatus at the insertion of the disk cartridge from an insertion opening, at least two of the four positioning portions are used.

3 Claims, 30 Drawing Sheets

U.S. PATENT DOCUMENTS

2006/0137739 A1    6/2006    Imoto et al.

FOREIGN PATENT DOCUMENTS

| EP | 1 100 086 A2 | 5/2001 |
|---|---|---|
| EP | 1 152 418 A1 | 11/2001 |
| EP | 1 156 488 A2 | 11/2001 |
| EP | 1 431 971 A1 | 6/2004 |
| JP | 05-225743 | 9/1993 |
| JP | 07-029350 | 1/1995 |
| JP | 10-255863 A | 9/1998 |
| JP | 11-354169 A | 12/1999 |
| JP | 2000-106222 A | 4/2000 |
| JP | 2000-195569 A | 7/2000 |
| JP | 2000-231942 A | 8/2000 |
| JP | 2000-285975 A | 10/2000 |
| JP | 2001-93591 A | 4/2001 |
| JP | 2001-143771 A | 5/2001 |
| JP | 2001-253883 A | 9/2001 |
| JP | 2002-8740 A | 1/2002 |
| JP | 2002-8741 A | 1/2002 |
| JP | 2002-25635 A | 1/2002 |
| JP | 2002-175843 A | 6/2002 |
| JP | 2002-222971 A | 8/2002 |
| JP | 2002-289269 A | 10/2002 |
| JP | 2002-289274 A | 10/2002 |
| JP | 2002-319689 A | 10/2002 |
| JP | 2002-352868 A | 12/2002 |
| JP | 2002-352869 A | 12/2002 |
| JP | 2002-352870 A | 12/2002 |
| JP | 2002-353432 A | 12/2002 |
| JP | 2003-036627 | 2/2003 |
| JP | 2003-051168 | 2/2003 |

OTHER PUBLICATIONS

Adachi, Motonari, "Dye-Sensitized Solar Cells Using Semiconductor Thin Film Composed of Titania Nanotubes," Electrochemistry, Jun. 2002, vol. 70, No. 6, pp. 449-452.

Adachi, Motonari, "Formation, Characterization, and Functions of Ceramic Nanotubes," Transactions of the Materials Research Society of Japan, Sep. 2002, vol. 27, No. 3, pp. 505-508.

Ngamsinlapasathian, S., "Titania Nanotube o Mochiiru Shikiso Zokan Taiyodenchi no Kokoritsuka," The Society of Chemical Engineers, Japan Dai 35 Kai Shuki Taikai Kenkyu Happyo Koen Yoshishu, Aug. 2002, p. 843.

Ngamsinlapasathian, S., "Higher Efficiency in Dye-Sensitized Solar Cells Using Titania Nanotube,"2002 Nen Denki Kagaku Shuki Taikai Koen Yoshishu, Sep. 2002, p. 138.

Adachi, M., "Formation of Titanium Oxide Nanotubes and Application to Dye-Sensitized Solar Cells," The Electrochemical Society of Japan Dai 68 Kai Taikai Koen Yoshishu, Mar. 2001, p. 112.

Murata, Y., The Synthetic Conditions of Titania Nanotubes Using Template of Molecular Assemblies, CSJ: The Chemical Society of Japan Dai 82 Shuki Nenkai Koen Yokoshu, Sep. 2002, p. 178.

E-mail from Silva, E ; "US 20060107994—Requesting IDS of 6,766,817"; May 25, 2006.

E-mail from Silva, E ; "US 20050016578—Requesting IDS of 6,766,817"; May 25, 2006.

\* cited by examiner

DISK CARTRIDGE

CROSS REFERENCE TO RELATED APPLICATION

This application claims priority from Japanese Priority Document No. 2003-107377, filed on Apr. 11, 2003 with the Japanese Patent Office, which document is hereby incorporated by reference.

BACKGROUND OF THE INVENTION

1. Field of the Invention

The present invention generally relates to a disk cartridge, and more particularly to a technology for increasing the degree of freedom in the design of a disk drive apparatus and the positioning accuracy of a disk cartridge to the disk drive apparatus by forming four positioning portions on a shell of the disk cartridge.

2. Description of the Related Art

There are disk cartridges, each including a shell and a disk-shaped recording medium rotatably housed in the shell, in which the shell is provided with an opening portion formed thereon for exposing a part of the disk-shaped recording medium to the outside (see, for example, Patent Document 1).

When such disk cartridge is inserted into a disk drive apparatus from its insertion opening, the opening portion of the disk cartridge is opened, and then the disk-shaped recording medium is mounted on a disk table, which is to be inserted into the disk cartridge through the opening portion, to be rotated with the rotation of the disk table. When the disk-shaped recording medium is rotated, an optical pickup is activated, and the recording or the reproduction of an information signal to and from the disk-shaped recording medium is performed.

When the disk cartridge is inserted into the disk drive apparatus through the insertion opening, the shell of the disk cartridge is necessary to be located at a predetermined position and to be held at this position. A conventional disk cartridge have two positioning holes on the shell for the positioning of the disk cartridges. The positioning holes are, for example, formed apart on a right position and a left position of the end on the front side in the inserting direction of the disk cartridge into the insertion opening, that is, in a direction perpendicular to the thickness direction of the disk-shaped recording medium. One of the positioning holes is formed to be a circle, and the other of them is formed to be elongated in a right and left direction.

When such disk cartridge is inserted into the disk drive apparatus through the insertion opening and is moved horizontally, the inserted disk cartridge is led into a disk holder provided in the inside of the disk drive apparatus while the positional regulation of the disk cartridge in the right and left direction is performed. When the disk holder is then vertically moved to descend, two positioning pins provided in the inside of the disk drive apparatus are inserted into the respective positioning holes, and then the disk cartridge is located at a predetermined position.

[Patent Document 1] Japanese Patent Application Laid-Open Publication No. 2001-332058

As described above, in the conventional disk cartridge, the positioning relative to the disk drive apparatus is performed by means of the predetermined two positioning holes, and there is only one arrangement of the positioning pins to be formed in the disk drive apparatus, and consequently there is a problem that the designing of the disk drive apparatus is restricted to decrease the degree of freedom of the design thereof.

Moreover, when there is a displacement of the positions of the two positioning holes in the inserting direction, there is the possibility that a dimensional tolerance owing to the displacement is generated to generate a positional displacement of the disk cartridge owing to the dimensional tolerance.

SUMMARY OF THE INVENTION

Accordingly, a disk cartridge according to the present invention aims to overcome the above-mentioned problems to increase the degree of freedom of the design of a disk cartridge and the positioning accuracy thereof.

For solving the problems mentioned above, a disk cartridge according to a first aspect of the present invention is a disk cartridge to be inserted into a disk drive apparatus through an insertion opening of the disk drive apparatus including a shell and a disk-shaped recording medium rotatably housed in the shell. The shell is provided with at least an opening portion through which a disk table provided in the disk drive apparatus is inserted. The disk cartridge includes four positioning holes or four positioning grooves formed on the shell as positioning portions to the disk drive apparatus. These four positioning holes or the four positioning grooves are designated as a first positioning portion, a second positioning portion, a third positioning portion and a fourth positioning portion, respectively, and if defined that two directions which are perpendicular to a thickness direction of the disk-shaped recording medium are designated as an X direction and a Y direction, and further defined that an inserting direction to the insertion opening and an opposite direction to the inserting direction are designated as the Y direction, then the first positioning portion and the second positioning portion are formed at the same position in the X direction, and the third positioning portion and the fourth positioning portion are formed at the same position different from the position of the first positioning portion and the second positioning portion in the X direction, and the first positioning portion and the third positioning portion are formed at the same position in the Y direction, and further the second positioning portion and the fourth positioning portion are formed at the same position in the Y direction different from the position of the first positioning portion and the third positioning portion. In the positioning of the disk cartridge to the disk drive apparatus at insertion of the disk cartridge into the disk drive apparatus through the insertion opening, at least two of the four positioning portions are used.

Consequently, the disk cartridge according to the present aspect of the invention is located to the disk drive apparatus by means of at least two arbitrary positioning portions.

Moreover, the use of at least two positioning portions among the first positioning portion, the second positioning portion, the third positioning portion, and the fourth positioning portion for the positioning the disk cartridge to the disk drive apparatus increases the degree of freedom of the arrangement positions of the positioning portions to be provided in the disk drive apparatus, and enables the increase of the degree of freedom of designing the disk drive apparatus. Moreover, the increase of the degree of freedom of designing makes it possible to simplify the mechanism of the disk drive apparatus, and to miniaturize the disk drive apparatus.

Moreover, because the first positioning portion and the second positioning portion are formed at the same position in the X direction, the third positioning portion and the fourth positioning portion are formed at the same position in the X direction, the first positioning portion and the third positioning portion are formed at the same position in the Y direction, and the second positioning portion and the fourth positioning portion are formed at the same position in the Y direction, there is no possibilities that any positional displacements are caused between the first positioning portion and the second positioning portion, and between the third positioning portion and the fourth positioning portion owing to dimensional tolerances in the X direction, and there is no possibilities that any positional displacements are caused between the first positioning portion and the third positioning portion, and between the second positioning portion and the fourth positioning portion owing to dimensional tolerances in the Y direction. Consequently, the positioning accuracy of the disk cartridge can be increased.

According to a second aspect of the present invention, the first positioning portion and the third positioning portion are positioned on the inserting direction side to the second positioning portion and the fourth positioning portion, and the first positioning portion and the third positioning portion are opened to at least the inserting direction side. The first positioning portion or the third positioning portion is used as the positioning of the disk cartridge to the disk drive apparatus when the disk cartridge is inserted through the insertion opening. Consequently, the positioning of the disk cartridge is performed in a predetermined direction when the disk cartridge is inserted from the insertion opening. Hence, it is difficult for the opening edge of the second positioning portion or the fourth positioning portion of the disk cartridge to be contacted with the positioning portions of the disk drive apparatus, and planing or the like between them owing to the contact can be prevented.

According to a third aspect of the present invention, the four positioning portions are opened to the same direction as the opening direction of the opening portion of the shell, and the positioning of the disk cartridge to the disk drive apparatus is performed at the time of a movement of the disk cartridge toward the opening direction of the opening portion. Consequently, the positioning of the disk cartridge to the disk drive apparatus can be performed at the same time as the insertion of the disk table into the opening portion, and the operation of the disk drive apparatus can be made to be more efficient and faster.

DETAILED DESCRIPTION OF THE PREFERRED EMBODIMENTS

Hereinafter, the attached drawings will be referred to while the preferred embodiment of a disk cartridge according to the present invention is described.

First, a disk drive apparatus in which the disk cartridge 1 is inserted and used will be described (see FIGS. 1 to 7). A disk drive apparatus 50 is composed of an outer casing 51, in which each of predetermined portions is arranged (see FIG. 1). On a front surface of the outer casing 51, an insertion opening 51a extended in a lateral direction is formed. The insertion opening 51a functions not only as an inserting portion through which the disk cartridge 1 is inserted in the outer casing 51, but also as an ejection portion, through which the disk cartridge 1 is ejected from the outer casing 51.

Figure 2:
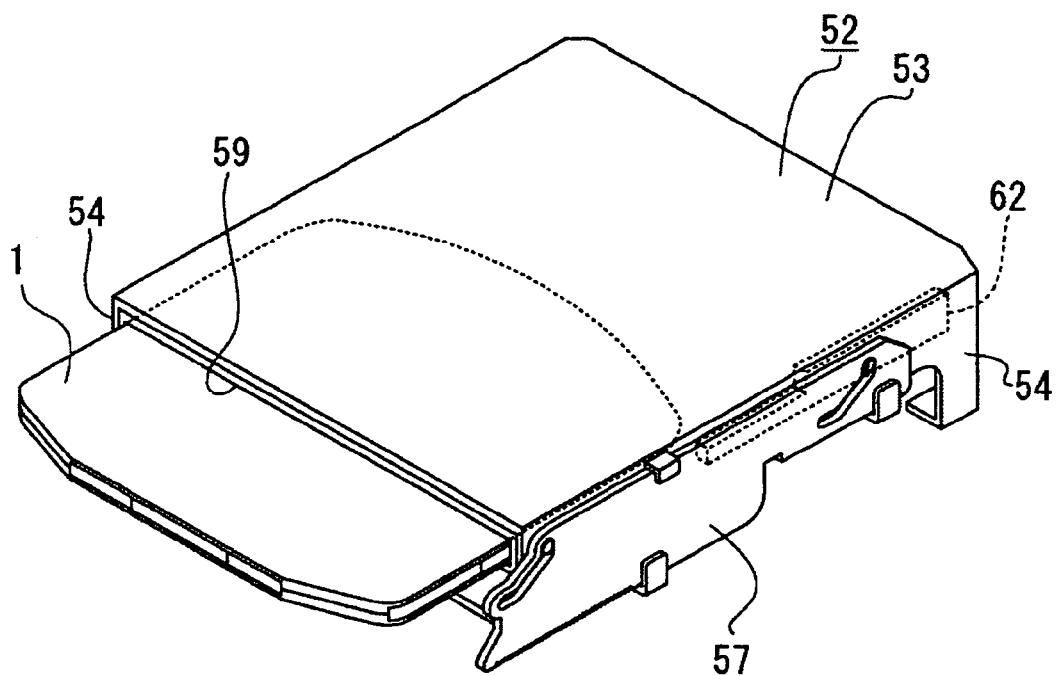
FIG. 2 is a schematic perspective view showing the disk cartridge and a disk holder.

In the outer casing 51, a fixed frame 52 is arranged. As shown in FIG. 2, the fixed frame 52 includes a top plate portion 53 and side plate portions 54 both provided perpendicularly downward from side edges on both the sides of the top plate portion 53. In each of the side plate portions 54, two guide holes 55 are formed apart at a front position and at a rear position (see FIG. 3). Each of the guide holes 55 is composed of a horizontal portion 55a elongated in a front and rear direction and a vertical portion 55b elongated downward from one end of the horizontal portion 55a. At the lower end of each of the side plate portions 54, drive gears 56 are supported, and these drive gears 56 are synchronously rotated by a driving force of a not shown drive motor.

Figure 3:
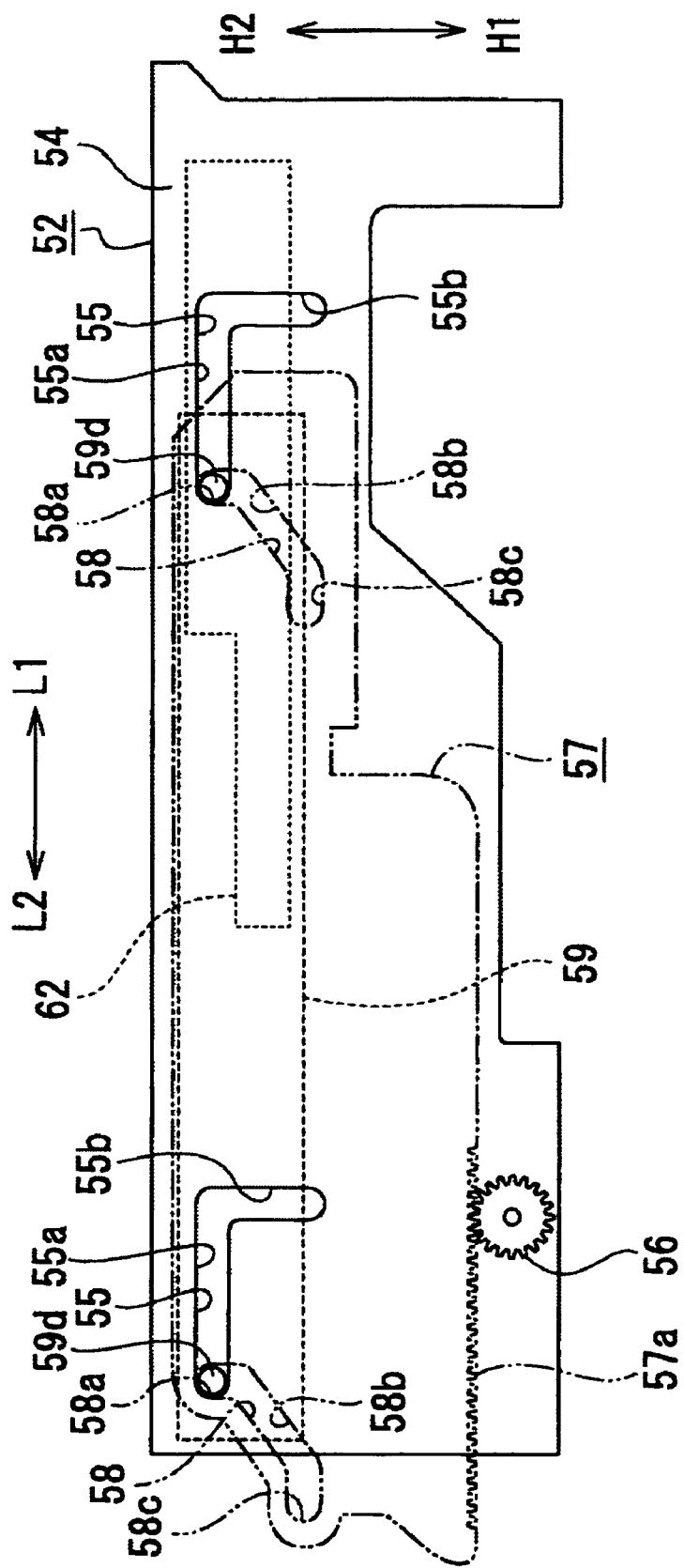
FIG. 3 is a schematic side view showing a fixed frame, a cam slider and a rack member.

In each of the side plate portions 54, cam sliders 57 are supported slidably in the front and rear direction (a L1–L2 direction shown in FIG. 3). At the lower end of each of the cam sliders 57, rack portions 57a are formed, and the drive gears 56 are engaged with the rack portions 57a, respectively. Consequently, when the drive gears 56 are rotated by the driving force of the drive motor, the cam sliders 57 are synchronously slid in the L1 and L2 directions shown in FIG. 3 according to the rotational directions of the drive gears 56.

In each of the cam sliders 57, cam holes 58 are formed separately at a front position and at a rear position. Each of the cam holes 58 is composed of an upper side holding portion 58a, a cam inclining portion 58b continued from the upper side holding portion 58a, and a lower side holding portion 58c continued from the cam inclining portion 58b. The more a position of the cam inclining portion 58b advances toward the L2 direction, the more the position is displaced downward. The lower side holding portion 58c is formed to be elongated in the front and rear direction.

Figure 4:
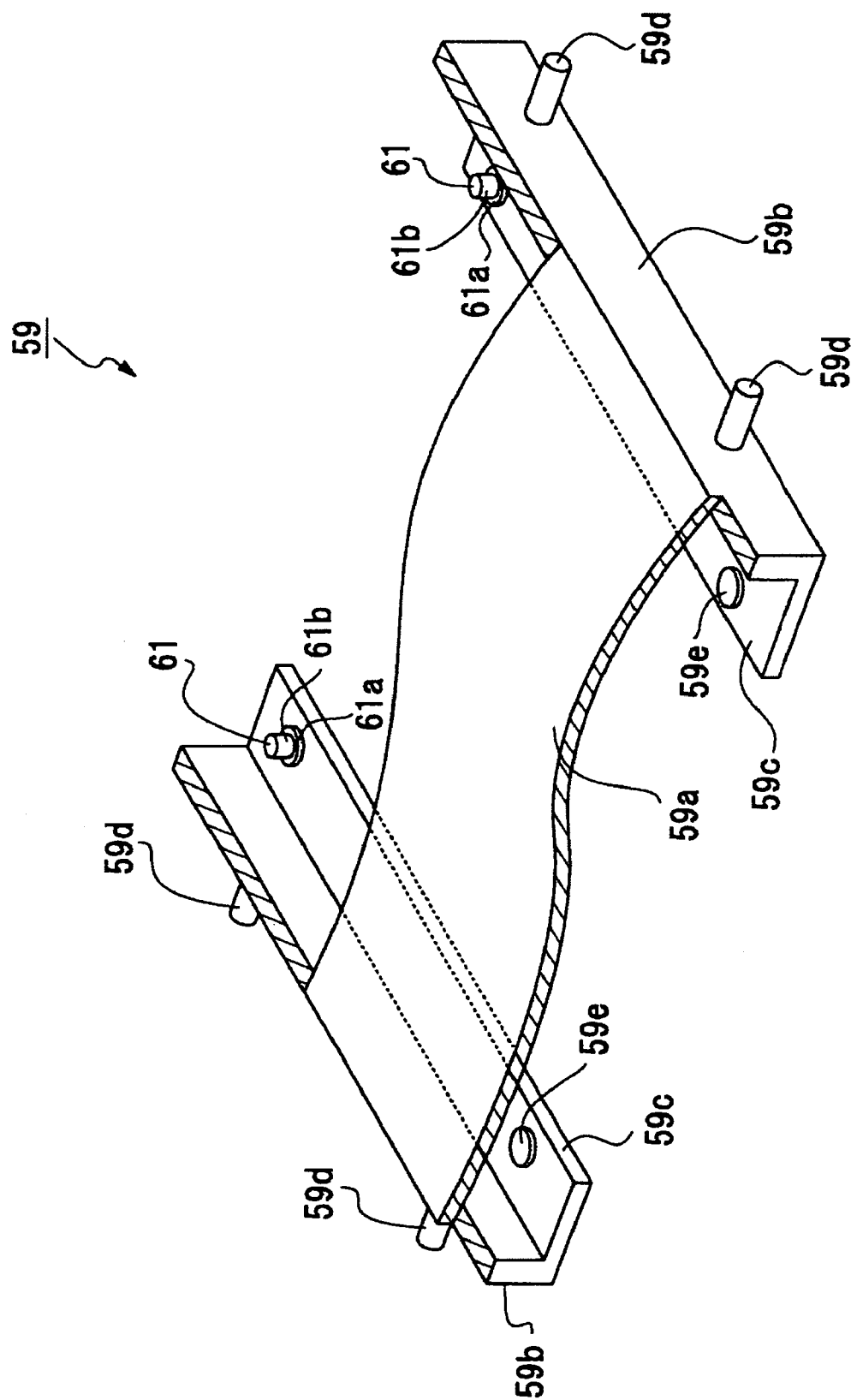
FIG. 4 is a perspective view showing the disk holder broken in part.

In the inside of the fixed frame 52, a disk holder 59 is arranged (see FIGS. 2 and 3). The disk holder 59, as shown in FIG. 4, includes a top surface portion 59a, side surface portions 59b provided perpendicularly downward from side edges on both the sides of the top surface portion 59a, and receiving surface portions 59c protruding from the inferior edges of the side surface portions 59b so as to approach to each other.

On each of the side surface portions 59b, two guided pins 59d are provided apart at a front position and at a rear position. The guided pins 59d respectively protrude toward the outside (side directions) from the side surface portions 59b. Each of the guided pins 59d is, as shown in FIG. 3, inserted into one of the guide holes 55 of the fixed frame 52 and one of the cam holes 58 of the cam sliders 57 to be slidably engaged with the guide hole 55 and the cam hole 58.

Figure 13:
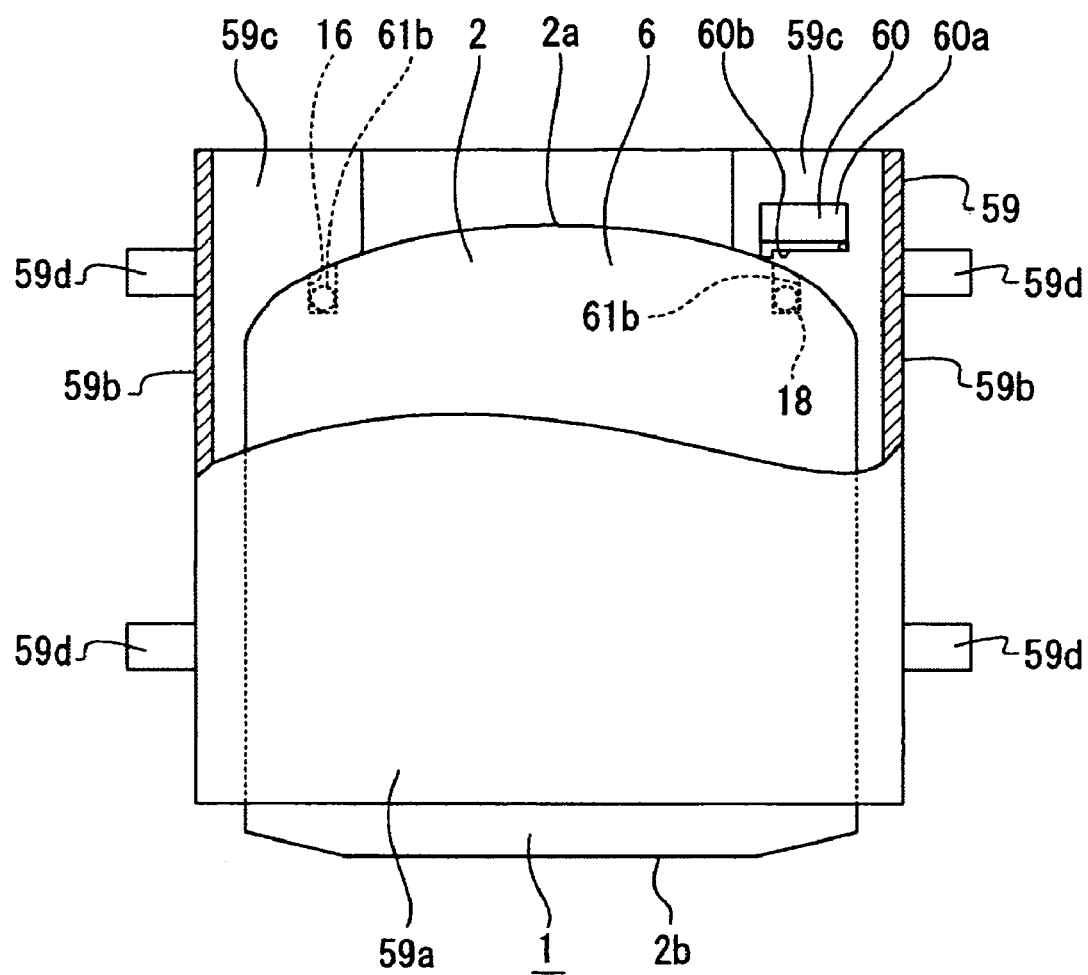
FIG. 13 is a plan view showing a state in which the disk cartridge is inserted into the insertion opening and positioning pins are inserted into a first positioning portion and a third positioning portion, respectively, with a part of a side surface portion being broken.

At the rear end of the receiving surface portion 59c on the right side, a detection sensor 60 is arranged (see FIG. 13). The detection sensor 60 includes a substrate 60a, and a detection arm 60b so as to rotate against the substrate 60a. When the detection arm 60b is rotated by being pressed toward the direction of the substrate 60a, completion of the insertion of the disk cartridge 1 into the disk holder 59 is detected.

Incidentally, the means for detecting the insertion completion state of the disk cartridge 1 to the disk holder 59 is not limited to the detection sensor 60, but other detection sensors such as an optical sensor and a magnetic sensor can be used in place of the detection sensor 60. In the inside of the disk holder 59, a not shown presser bar spring for urging the disk cartridge 1 downward is arranged.

At each of the rear ends of the receiving surface portions 59c, a positioning portion 61 protruding in the upper direction is formed (see FIG. 4). Each of the positioning portions 61 is composed of a receiving pedestal portion 61a shaped in a disk and a positioning pin 61b protruding upward at the central part of the receiving pedestal portion 61a.

A receiving pedestal portion 59e protruding upward is formed at the front end of each of the receiving surface portions 59c. The top surfaces of the receiving pedestal portions 59e are made to have the same height as those of the receiving pedestal portions 61a.

Figure 1:
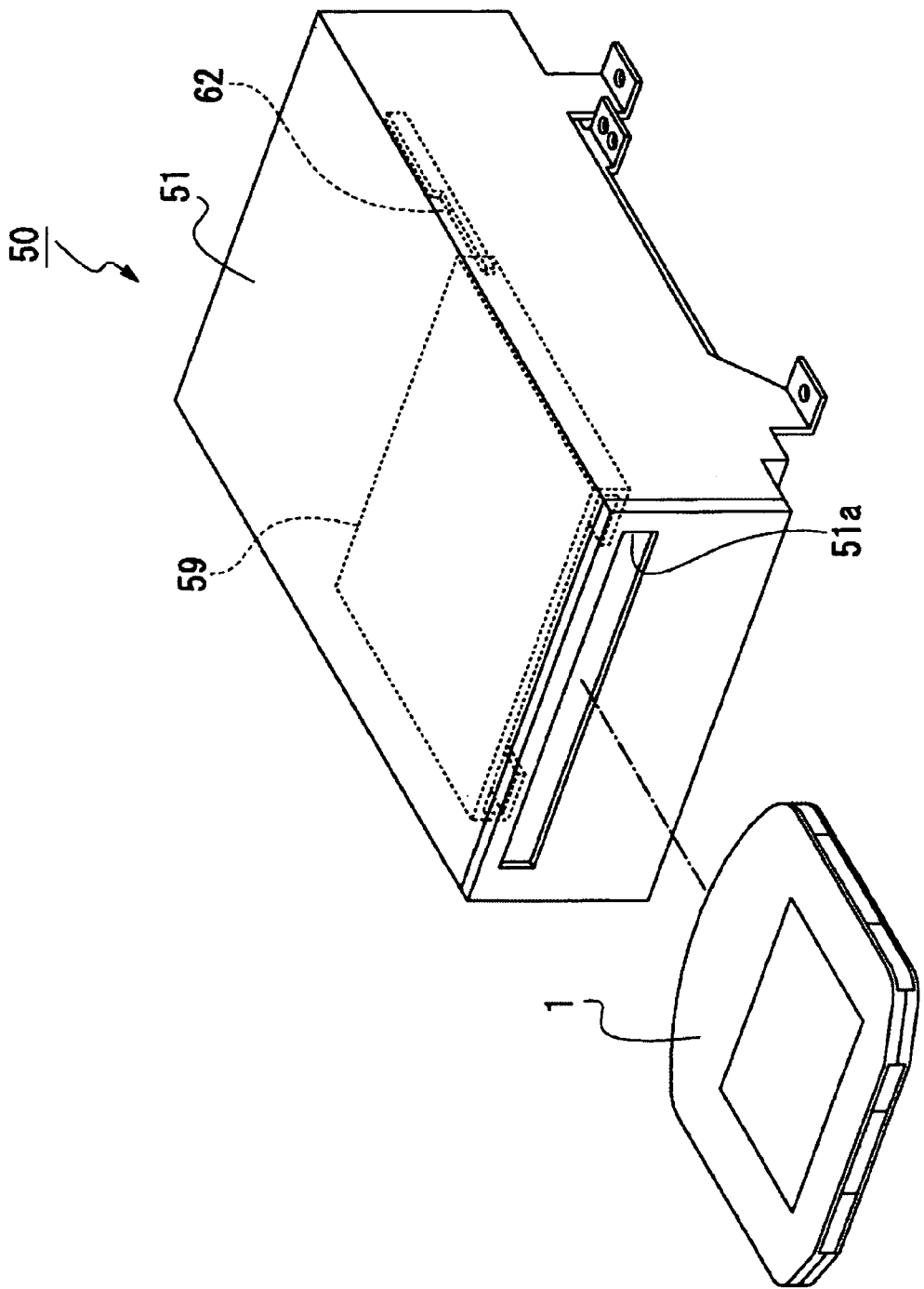
FIG. 1 is a schematic perspective view showing a disk cartridge and a disk drive apparatus of an embodiment of the present invention together-with following FIGS. 2 to 31.
Figure 5:
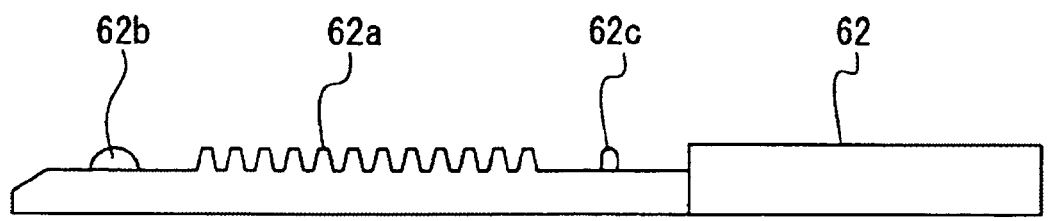
FIG. 5 is an enlarged plan view showing the rack member.
Figure 6:
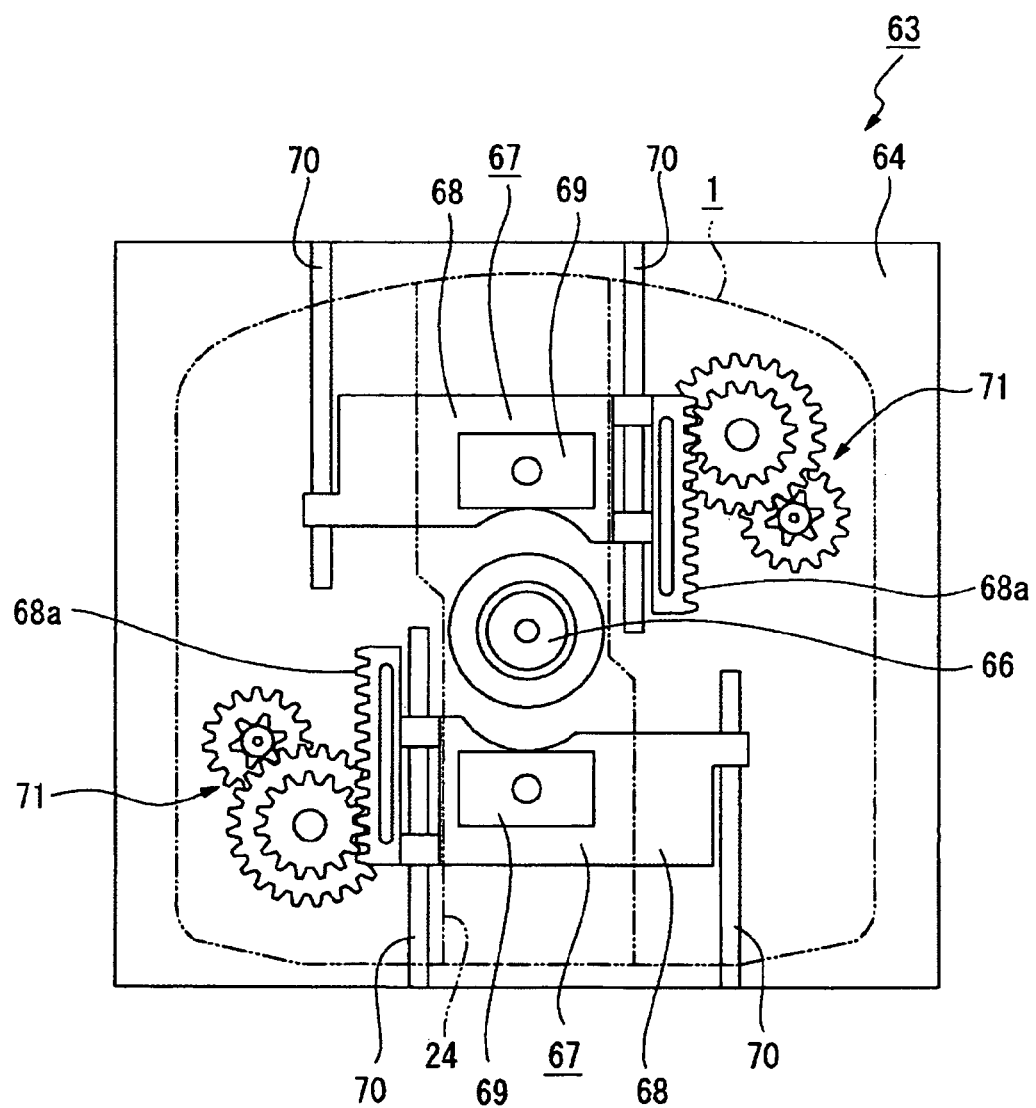
FIG. 6 is a schematic plan view showing a base unit.
Figure 7:
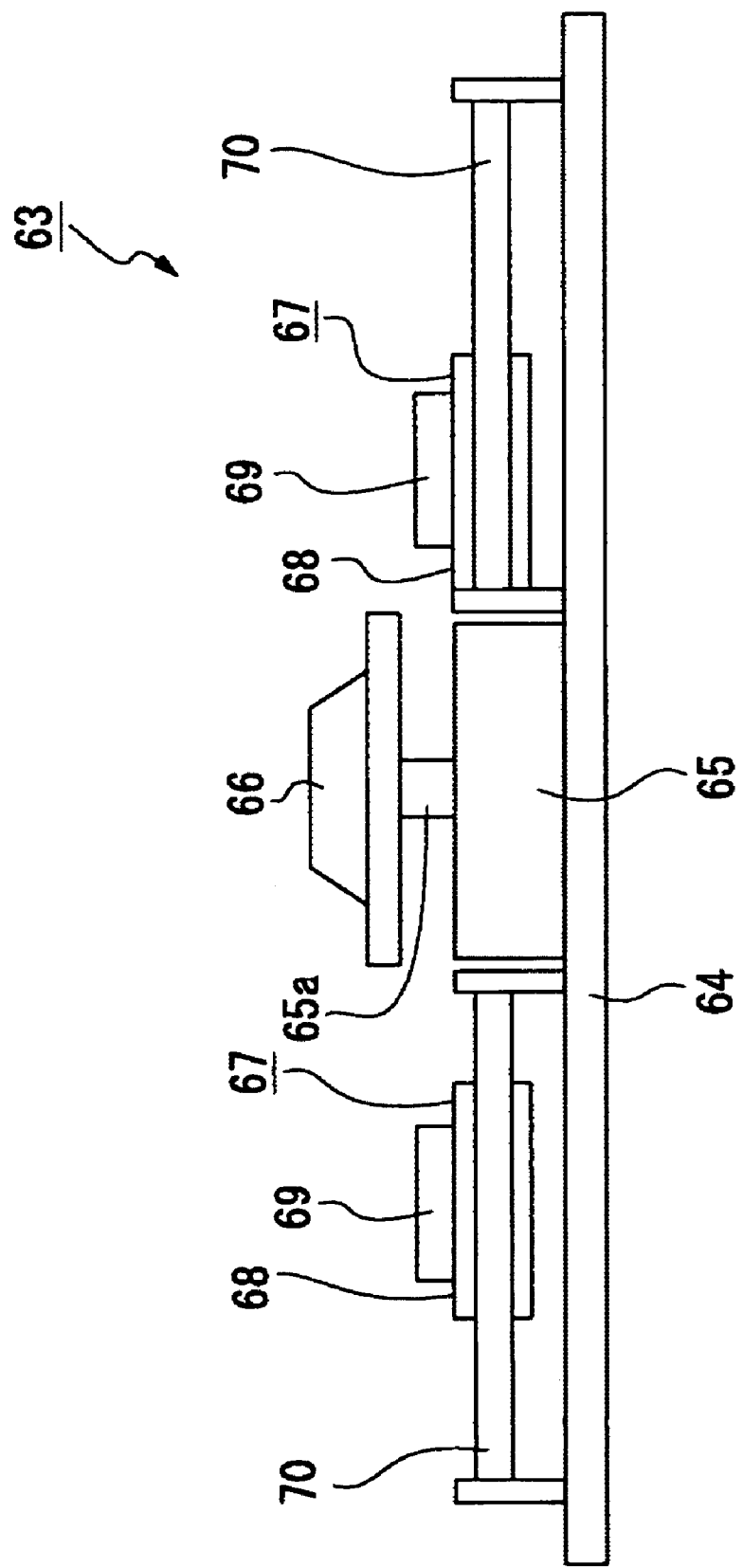
FIG. 7 is a schematic side view showing the base unit.

On the inner surface of one of the side surface portions 59b of the disk holder 59, a rack member 62 is supported movably in the front and rear direction (see FIG. 1). The rack member 62 is, as shown in FIG. 5, formed to be elongated in the front and rear direction, and includes a rack 62a formed on the inner surface of the rack member 62, namely on the surface on the counter side of the side opposed to the side surface portion 59b. At a front position and a rear position of the rack 62a, an operation protruding portion 62b and a lock protruding portion 62c, both protruding inwards, are formed, respectively. The rack member 62 is moved in the front and rear directions by a not shown drive mechanism.

In the inside of the disk drive apparatus 50, a base unit 63 is arranged. The base unit 63 is composed of predetermined each unit arranged on an arranging base 64 (see FIGS. 6 and 7). At substantially the central part of the arranging base 64, a spindle motor 65 is arranged, and a disk table 66 is fixed to the motor shaft 65a of the spindle motor 65. A not shown magnet is buried in the disk table 66.

On the arranging base 64, optical pickups 67 are supported movably at a front position and at a rear position with the disk table 66 between them. Each of the optical pickups 67 includes a movable base 68, and a two-axis actuator 69 supported on the movable base 68. Each of the movable bases 68 is provided with a driving rack 68a. Further, on the arranging base 64, two pairs of two guide axes 70 are arranged apart at a front position and at a rear position with the disk table 66 between them. The optical pickups 67 are guided by the pairs of the guide axes 70 to move in the front and rear direction, respectively.

The arranging base 64 is also provided with speed reducing mechanisms 71 each equipped with a plurality of gears.

The gears at the last stages of the speed reducing mechanisms 71 are engaged with the driving racks 68a of the movable bases 68, respectively. Consequently, when the speed reducing mechanisms 71 are made to operate by the driving forces of the not shown motor, the driving racks 68a are moved into directions according to the rotational directions of the motor. Then, the optical pickups 67 are guided by the guide axes 70 to move forward and/or backward.

Figure 8:
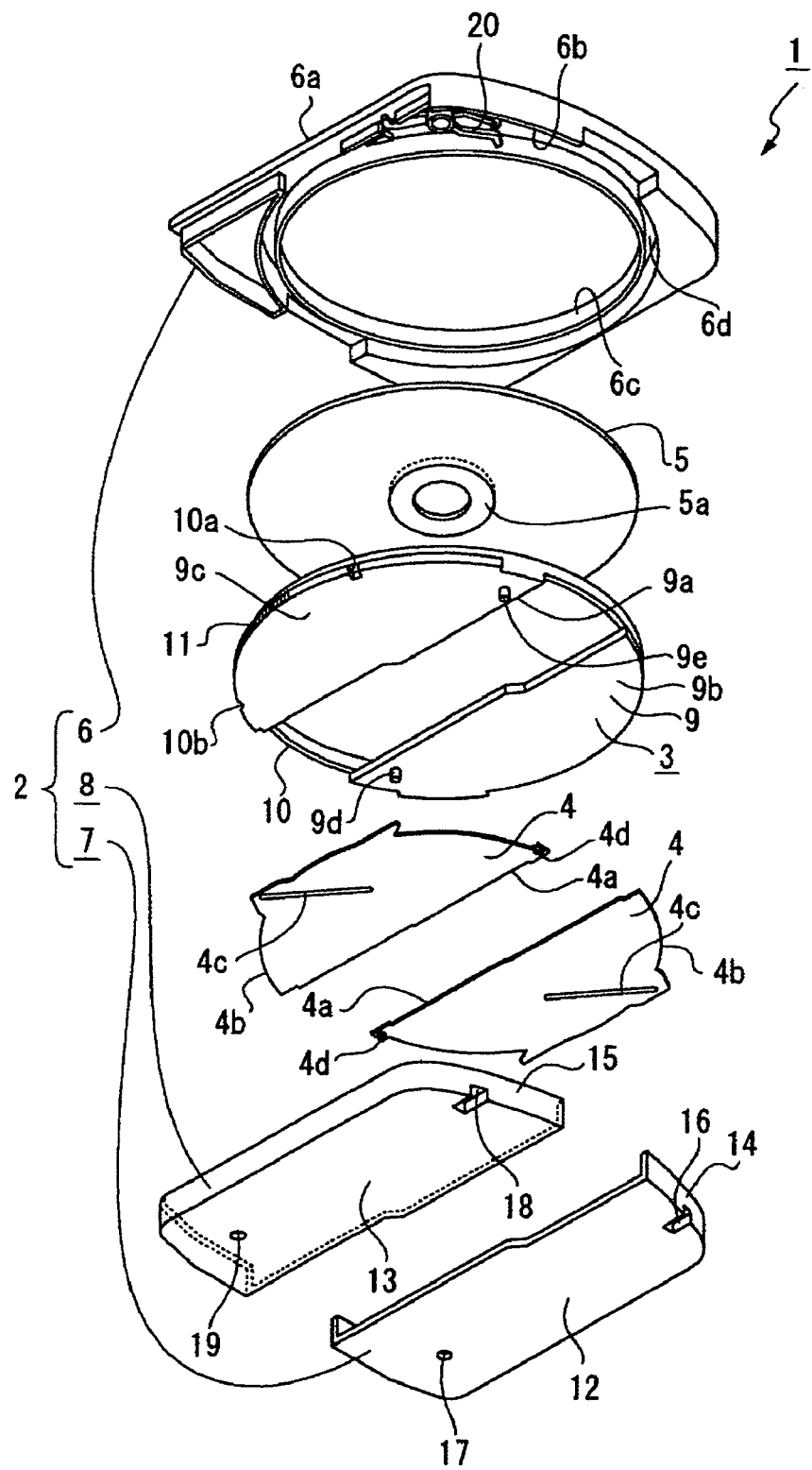
FIG. 8 is an exploded perspective view showing the disk cartridge.

Next, the disk cartridge 1 will be described (see FIGS. 8 to 11). The disk cartridge 1 is formed to be a flat shape. As shown in FIG. 8, the disk cartridge 1 is equipped with an outer shell 2, an inner shell 3, a pair of shutter members 4, and a disk-shaped recording medium 5.

Figure 9:
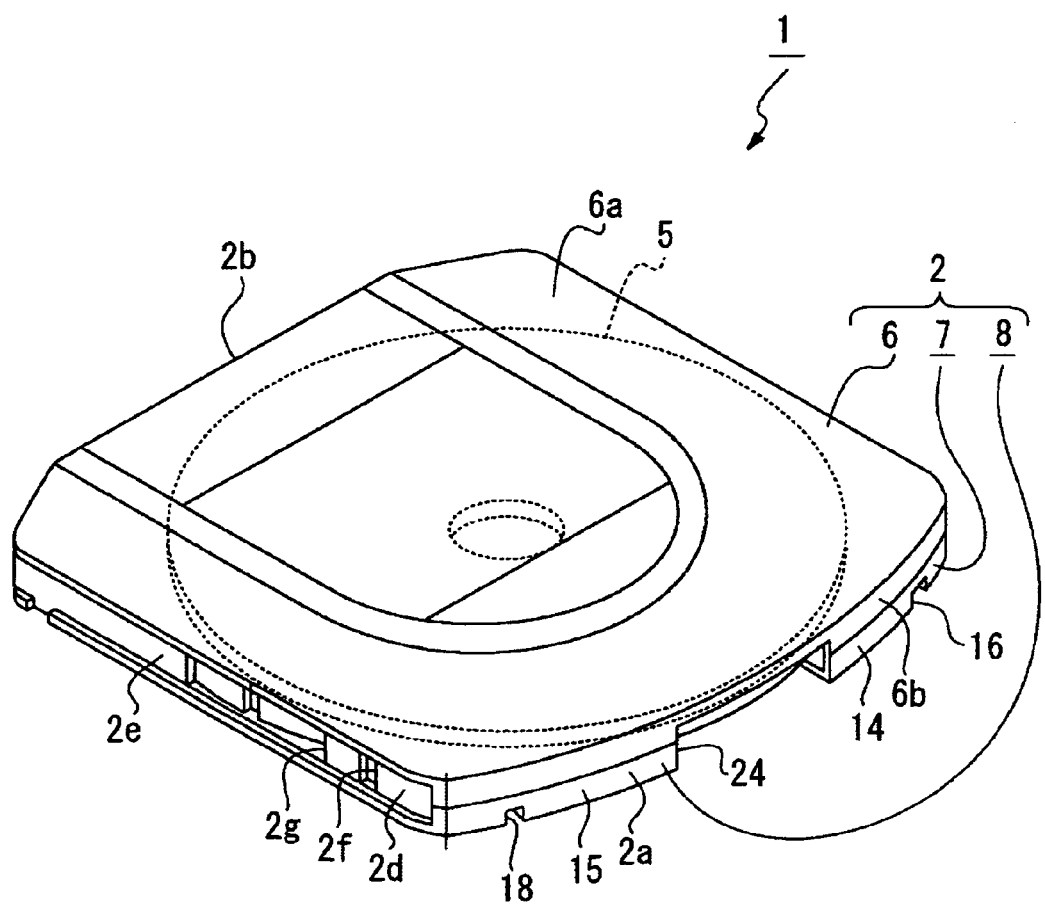
FIG. 9 is a perspective view showing the disk cartridge.

The outer shell 2 is composed of a first shell 6 and second shells 7 and 8, and the first shell 6 and the second shells 7 and 8 are united to be one body and to form an upper part and a lower part (see FIGS. 8 and 9).

Figure 10:
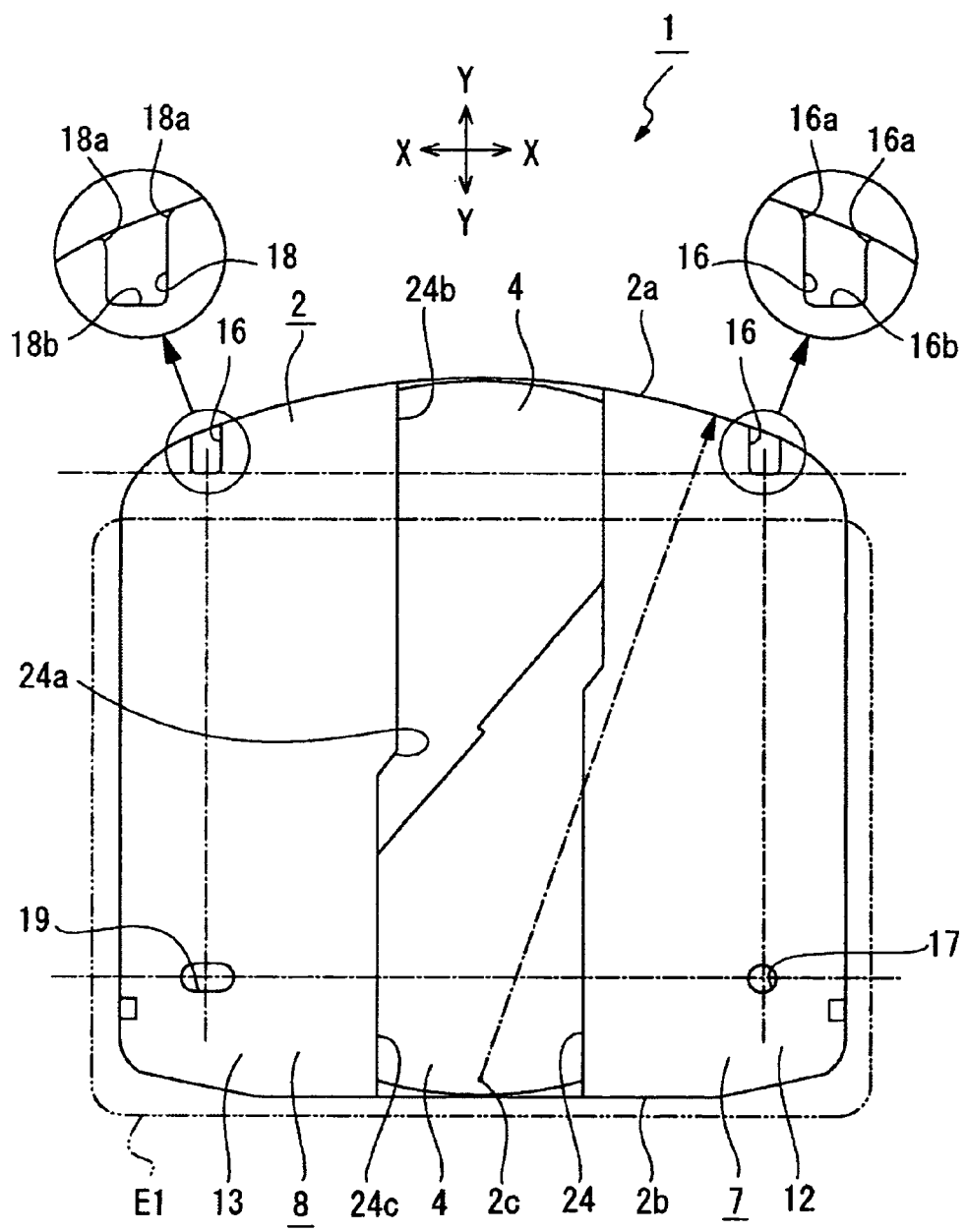
FIG. 10 is a bottom view showing the disk cartridge.

The outer shell 2 is formed to be almost a quadrilateral shape. A leading end edge 2a of the outer shell 2, namely one end edge on the inserting direction side when the disk cartridge 1 is inserted into the disk drive apparatus 50, is formed in a gentle circular arc. The leading end edge 2a is, as shown in FIG. 10, formed in a circular arc having a reference point 2c as the center positioned at the middle in a right and left direction in the neighborhood of a base end edge 2b, namely one end edge on the counter side of the inserting direction.

On the right side surface 2d of the outer shell 2, an insertion groove 2e elongated in the inserting direction is formed (see FIG. 9). On the right side surface 2d of the outer shell 2, a protruding portion insertion hole 2f is formed at a position close to the leading end edge 2a, and a gear insertion hole 2g is formed at a position more close to the side of the base end edge 2b than that of the protruding portion insertion hole 2f. The protruding portion insertion hole 2f and the gear insertion hole 2g are opened towards the insertion groove 2e.

The first shell 6 is formed in a shallow box being opened downward. The first shell 6 includes a principal surface portion 6a, and a peripheral surface portion 6b provided perpendicularly downward at the peripheral edge of the principal surface portion 6a. The first shell 6 is, as shown in FIG. 8, provided with a circular retainer wall 6c protruding downward at a part of an outer periphery side on the undersurface. A slide groove 6d opened downward along the outer periphery of the retainer wall 6c is formed on the first shell 6.

The inner shell 3 is composed of a flat surface portion 9 formed almost in a circular disc, and a ring portion 10 formed on the outer periphery edge of the flat surface portion 9 integrally formed to be one body. The ring portion 10 protrudes into the upper direction from the flat surface portion 9.

An opening cutout 9a is formed on the flat surface portion 9. The opening cutout 9a is formed between parts at positions located on almost 180° counter sides on the ring portion 10. Consequently, the flat surface portion 9 is divided into two parts of a first part 9b and a second part 9c with the opening cutout 9a put between them. The undersurfaces of the first part 9b and the second part 9c of the flat surface portion 9 are provided with supporting shafts 9d and 9e protruding downward, respectively.

On the outer surface of the ring portion 10, a gear 11 is formed at a part on the second part 9c side. On the outer surface of the ring portion 10, a lock concave portion 10a and an engage concave portion 10b are formed at positions on the counter sides in the circumferential direction with the gear 11 between them. The inner shell 3 is supported in a slidably rotatable form by the first shell 6 with the ring portion 10 being inserted into the slide groove 6d of the first shell 6.

The disk-shaped recording medium 5 includes a metal core 5a at the central part thereof. The disk-shaped recording medium 5 is housed in a rotatable state in the space formed between the first shell 6 and the flat surface portion 9 of the inner shell 3.

Each of the shutter members 4 is formed in a plate shape of almost a semi-circle. The outer peripheral edge portion of each of the shutter members 4 is composed of a chord side portion 4a and a circular arc side portion 4b. A guide hole 4c elongated in a predetermined direction and a supported hole 4d positioned at one end are formed on each of the shutter members 4.

The supporting shafts 9d and 9e of the inner shell 3 are inserted into the supported holes 4d of the shutter members 4, respectively. Thereby, the shutter members 4 are supported by the inner shell 3 in a slidably rotatable state around the supporting shafts 9d and 9e, respectively.

Figure 11:
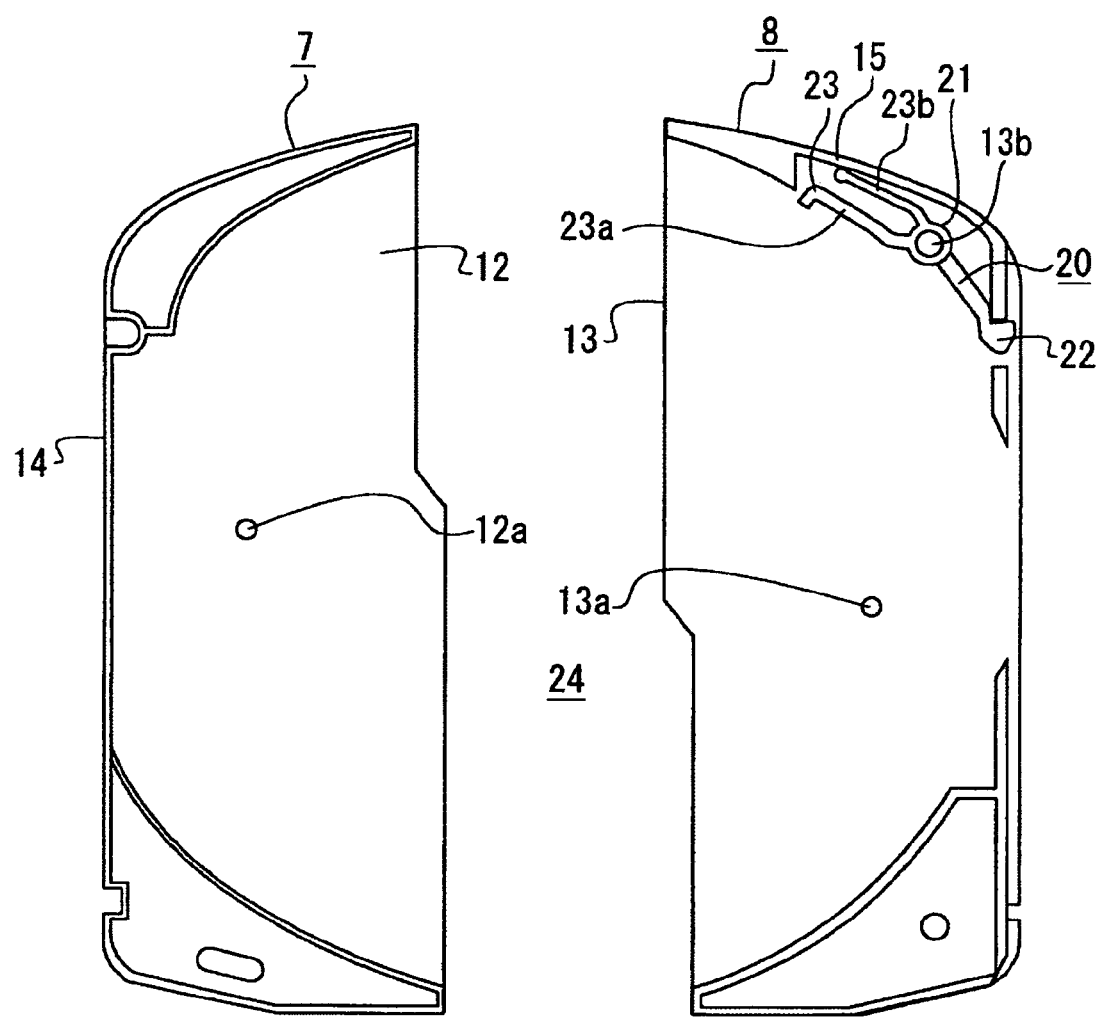
FIG. 11 is a plan view showing second shells.

The second shells 7 and 8 are, as shown in FIGS. 8 and 11, composed of a flat shaped principal surface portions 12 and 13, each formed in almost a rectangle longer than wide, and peripheral surface portions 14 and 15 protruding into the upper direction from the peripheral edge except the peripheral edge on the inside of the principal surface portions 12 and 13, respectively. The flat shaped principal surface portions 12 and 13 and the peripheral surface portions 14 and 15 are formed to be one body, respectively. Guide shafts 12a and 13a are formed on the top surfaces of the principal surface portions 12 and 13 of the second shells 7 and 8, respectively. The second shell 8 positioned on the right side is provided with a lock supporting shaft 13b protruding into the upper direction at a leading end of the principal surface portion 13.

On the undersurface of the principal surface portion 12, as shown in FIG. 10, a first positioning portion 16 and a second positioning portion 17 are formed at positions close to the left end in the state of being separated at a front position and at a rear position, namely separated in the inserting direction. Provided that the inserting direction and the opposite direction thereof are designated as a Y direction, and that a direction perpendicular to both of the thickness direction of the disk cartridge 1 and the Y direction is designated as an X direction (right and left direction), then the median of the first positioning portion 16 in the X direction and the median of the second positioning portion 17 in the X direction are positioned on the same line extending in the Y direction.

The first positioning portion 16 is opened to the inserting direction and the downward direction. At the opening edge portion in the inserting direction, lead portions 16a inclining into directions to be more apart from each other as being closer to the leading end edge 2a are formed. The second positioning portion 17 is opened downward, and is formed as a circle.

On the undersurface of the principal surface portion 13 a third positioning portion 18 and a fourth positioning portion 19 are formed at positions close to the right end in the state of being separated in the inserting direction. The median of the third positioning portion 18 in the X direction and the median of the fourth positioning portion 19 in the X direction are positioned on the same line extending in the Y direction.

The third positioning portion 18 is opened to the inserting direction and the downward direction. At the opening edge portion in the inserting direction, lead portions 18a inclining into directions to be more separated from each other as being closer to the leading end edge 2a are formed.

The fourth positioning portion 19 is opened downward, and is formed to be extended in a lateral direction. An end surface (interior surface), positioned on the counter direction to the inserting direction, of the first positioning portion 16 is formed as an interior side reference surface 16b, and an end surface (interior surface), positioned on the counter direction to the inserting direction, of the third positioning portion 18 is formed as an interior side reference surface 18b. The interior side reference surface 16b and the interior side reference surface 18b are positioned on the same line extending in the X direction.

The median of the second positioning portion 17 in the Y direction and the median of the fourth positioning portion 19 in the Y direction are positioned on the same line extending in the X direction.

A lock member 20 is supported by the lock supporting shaft 1b of the second shell 8 in a slidably rotatable state (see FIGS. 8 and 11). The lock member 20 is composed of an annular supported portion 21, an operation protruding portion 22 protruding into one direction from the supported portion 21, and a lock protruding portion 23 protruding into almost the opposite direction of the operation protruding portion 22 from the supported portion 21. The annular supported portion 21, the operation protruding portion 22, and the lock protruding portion 23 are formed to be one body. The lock protruding portion 23 is formed into a fork shape. The lock protruding portion 23 is composed of a lock piece portion 23a and an elastic contact piece portion 23b. The lock member 20 is supported by the second shell 8 in a slidably rotatable sate with the lock supporting shaft 13b being inserted into the supported portion 21.

In the state of the lock member 20 supported by the second shell 8, the leading end of the operation protruding portion 22 protrudes from the protruding portion insertion hole 2f of the outer shell 2, and the lock piece portion 23a and the elastic contact piece portion 23b elastically contact or abut with the outer surface of the ring portion 10 of the inner shell 3 and the inner surface of the peripheral surface portion 14 of the second shell 8, respectively.

The second shells 7 and 8 are united with the left end side part and the right end side part of the first shell 6 by, for example, being screwed, respectively. In the state of the second shells 7 and 8 united with the first shell 6, an opening is formed between the second shells 7 and 8, and the opening is used as an opening portion 24 to be opened and closed by the shutter members 4. The opening portion 24 is formed to be elongated in the inserting direction. The central part in the lengthwise direction is used as a table inserting portion 24a through which the disk table 66 is inserted into the disk cartridge 1, and parts on the opposite sides with the table inserting portion 24a are used as a first operating portion 24b and a second operating portion 24c, respectively. The first and the second operating portions 24b and 24c are transmission portions of laser beams irradiated from the optical pickups 67. The opening portion 24 is formed to have almost the same size and almost the same shape as those of the opening cutout 9a of the inner shell 3.

In the state of the second shells 7 and 8 united with the first shell 6, the guide shafts 12a and 13a formed on the principal surface portions 12 and 13 of the second shells 7 and 8 are slidably engaged with the guide holes 4c of the shutter members 4, respectively.

In the following, the operations of the disk cartridge 1 at the time of being inserted into the disk drive apparatus 50 through the insertion opening 51a will be described (see FIGS. 12 to 22).

First, the state of the disk cartridge 1 before the insertion thereof into the insertion opening 51a will be described (see FIG. 12). The lock piece portion 23a of the lock member 20 is engaged with the lock concave portion 10a of the ring portion 10 of the inner shell 3. Consequently, the inner shell 3 is locked at an initial position, at which the opening cutout 9a is inclined to the opening portion 24 by a predetermined angle, and thereby the rotation of the inner shell 3 to the outer shell 2 is regulated.

The guide shafts 12a and 13a of the second shells 7 and 8 are engaged with the guide holes 4c of the shutter members 4 at their ends on one side, namely the ends on the side of the circular arc side portions 4b, respectively. Consequently, the chord side portions 4a of the shutter members 4 are superposed to be held at a closed position.

The opening portion 24 of the outer shell 2 is closed because the shutter members 4 are at their closed positions. As the disk cartridge 1 is being inserted into the inside of the disk drive apparatus 50 through the insertion opening 51a, the disk cartridge 1 is moved along the side surface portions 59b of the disk holder 59, and the positioning pins 61b of the positioning portions 61 formed on the disk holder 59 are inserted into the first positioning portion 16 and the third positioning portion 18 in the state of being engaged (see FIG. 13). At this time, the positioning pins 61b are contacted with the interior side reference surface 16b of the first positioning portion 16 and the interior side reference surface 18b of the third positioning portion 18, respectively.

Because each of the lead portions 16a and 18a inclining into directions to be more apart from each other as being closer to the leading end edge 2a are formed at the first positioning portion 16 and the third positioning portion 18, the positioning pins 61 is guided by the lead portions 16a and 18a to be certainly and smoothly inserted into the first positioning portion 16 and the third positioning portion 18, respectively.

Figure 14:
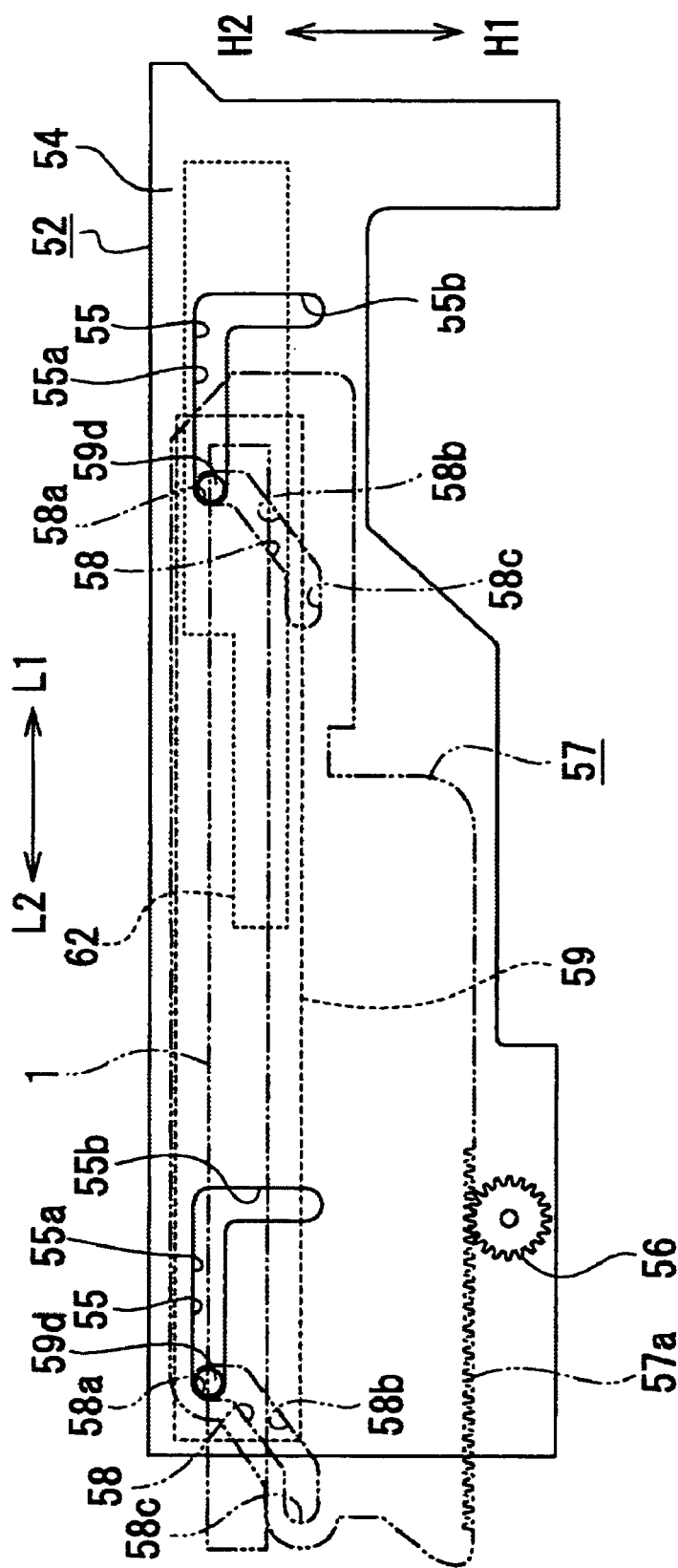
FIG. 14 is a schematic side view showing a state of the disk cartridge inserted through the insertion opening to a holding position.

After the positioning pins 61b are inserted into the first positioning portion 16 and the third positioning portion 18 until the positioning pins 61b are contacted with the interior side reference surfaces 16b and 18b, respectively, the disk cartridge 1 reaches a holding position where the disk cartridge 1 is held by the disk holder 59 (see FIG. 14). In the state in which the disk cartridge 1 reaches the holding position, a part of the disk cartridge 1 on the side of the base end edge 2b protrudes to the outside from the insertion opening 51a.

The insertion of the positioning pins 61b into the first positioning portion 16 and the third positioning portion 18 determines the positions of the disk cartridge 1 with the side surfaces of both the sides of either of the first positioning portion 16 and the third positioning portion 18, and thereby locates the disk cartridge 1 in the right and left directions (the X direction shown in FIG. 10) in the disk holder 59. At the same time, the contact of the positioning pins 61b with the interior side reference surfaces 16b and 18b determines the position of the disk cartridge 1 with the interior side reference surfaces 16b and 18b, and thereby locates the disk cartridge 1 in the front and back directions (the Y direction shown in FIG. 10) in the disk holder 59. Moreover, in the state of the positioning pins 61b inserted into the first positioning portion 16 and the third positioning portion 18, respectively, the disk cartridge 1 is urged downward by the presser bar spring provided in the disk holder 59, and the undersurface of the disk cartridge 1 is pressed against the receiving pedestal portions 61a of the positioning portions 61 and the receiving pedestal portion 59e of the disk holder 59. Thereby, the positioning of the disk cartridge 1 in the up and down directions in the disk holder 59 is performed.

Incidentally, in the state in which the disk cartridge 1 is inserted into the disk holder 59 and reaches the holding position, the disk cartridge 1 is pressed by a not shown presser member provided in the disk drive apparatus 1, and the movement of the disk cartridge 1 in the front and rear direction is regulated.

When the positioning pins 61b are inserted into the first positioning portion 16 and the third positioning portion 18, respectively, the detection arm 60b of the detection sensor 60 is pressed by the leading end edge 2a of the disk cartridge 1 to be rotated (see FIG. 13), and thereby the insertion of the disk cartridge 1 up to the holding position is detected by the detection sensor 60. When the insertion of the disk cartridge 1 up to the holding position is detected by the detection sensor 60, the rotation of the drive motor is started. The rotation of the drive motor rotates the drive gears 56 to slide the cam sliders 57 into the L1 direction shown in FIG. 14.

When the cam sliders 57 are slid into the L1 direction, the guided pins 59d are moved into the L1 direction in the horizontal portions 55a of the guide holes 55 of the fixed frame 52, and the disk holder 59 holding the disk cartridge 1 is moved into the L1 direction.

When the guided pins 59d reach the rear ends of the horizontal portions 55a, the disk holder 59 reaches at a retracted position (see FIG. 15), and the rotation of the drive gears 56 are temporarily stopped. When the disk holder 59 reaches the retracted position, the whole of the disk cartridge 1 is inserted in the disk drive apparatus 50.

Figure 15:
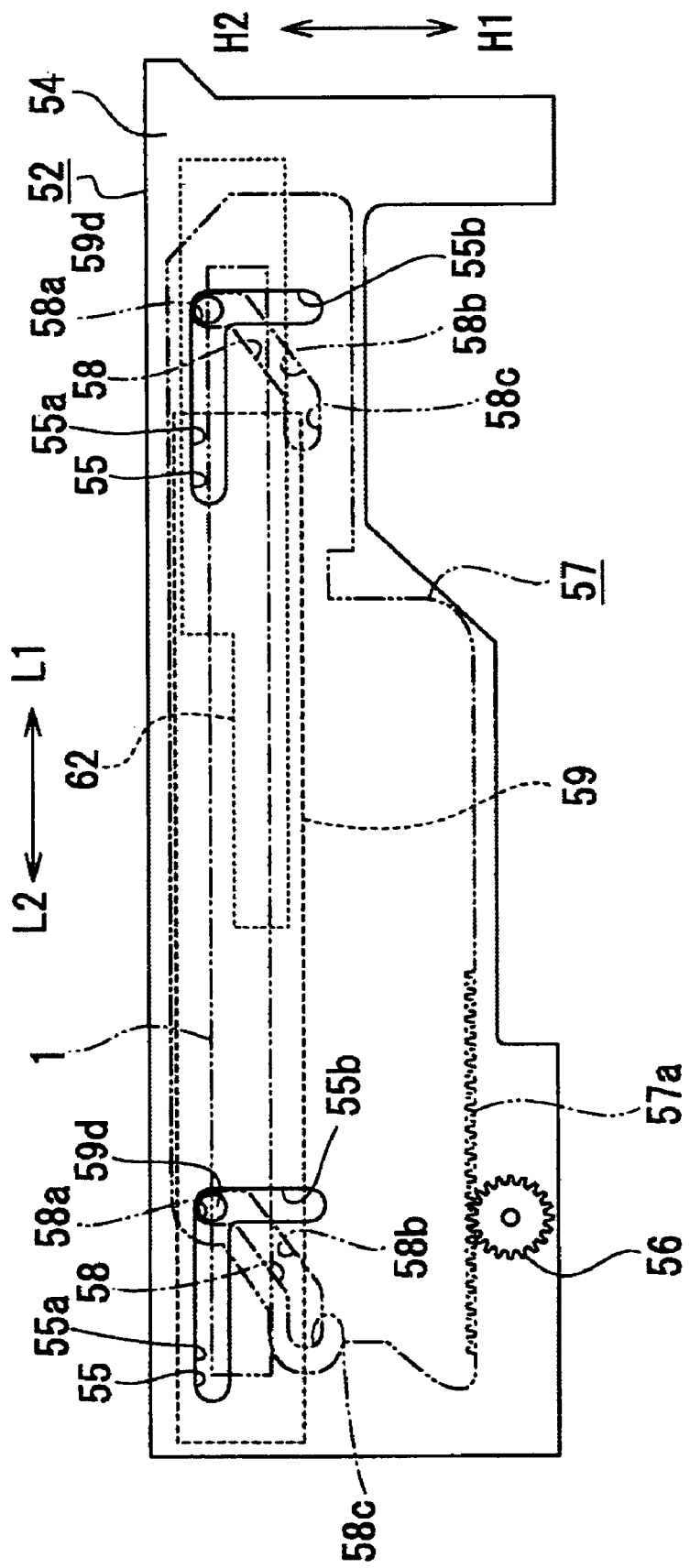
FIG. 15 is a schematic side view showing a state in which the disk holder has moved in a horizontal direction continuously to the state shown in FIG. 14.
Figure 16:
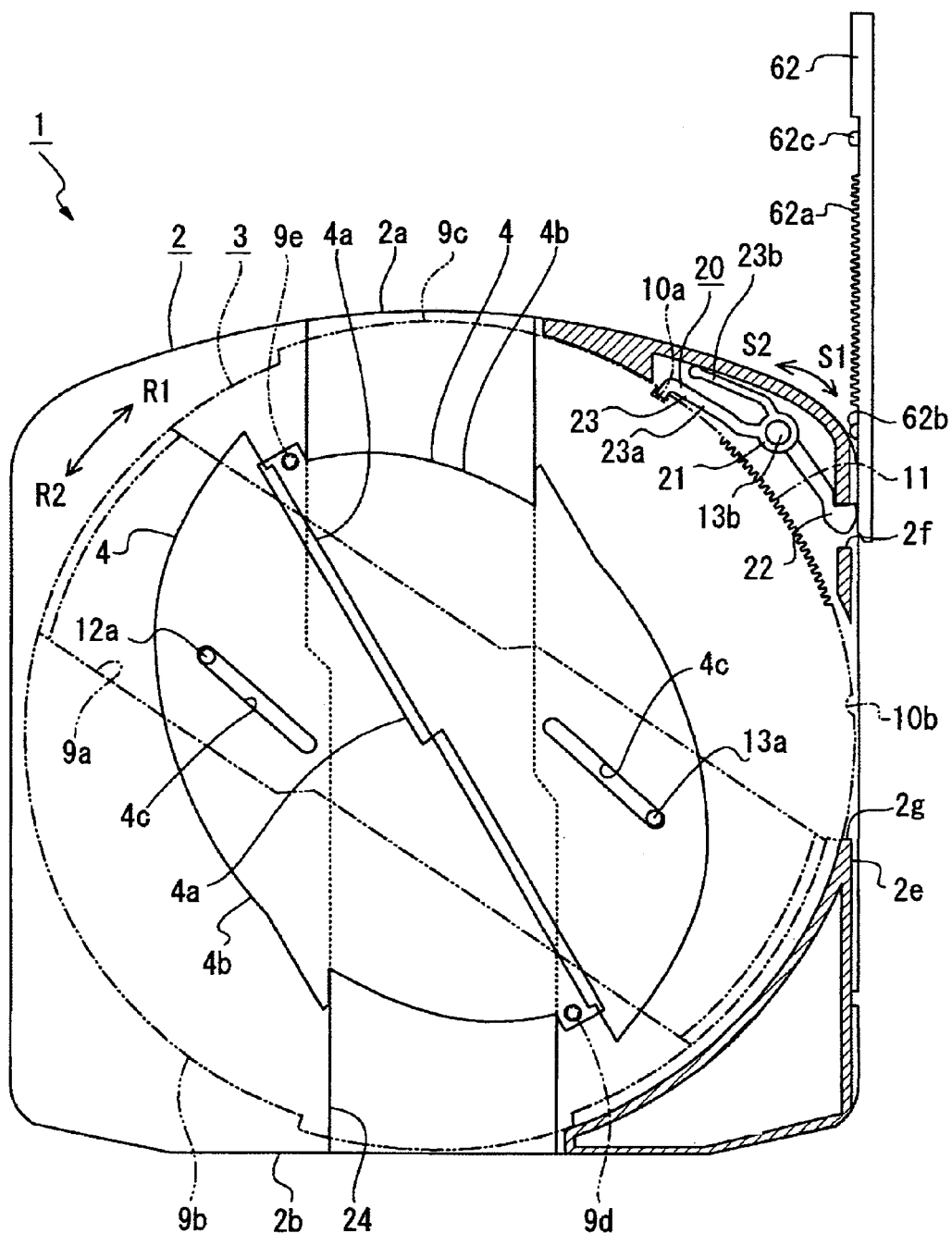
FIG. 16 is a schematic plan view showing a state of a rack member just after a start of a movement thereof with a part of an outer shell being as a cross section continuously to the state shown in FIG. 15.

Successively, the movement of the rack member 62 into the L2 direction shown in FIG. 15 is started. When the rack member 62 is moved into the L2 direction, the operation protruding portion 62b and the rack 62a are sequentially inserted into the insertion groove 2e of the outer shell 2 of the disk cartridge 1 (see FIG. 16).

Figure 17:
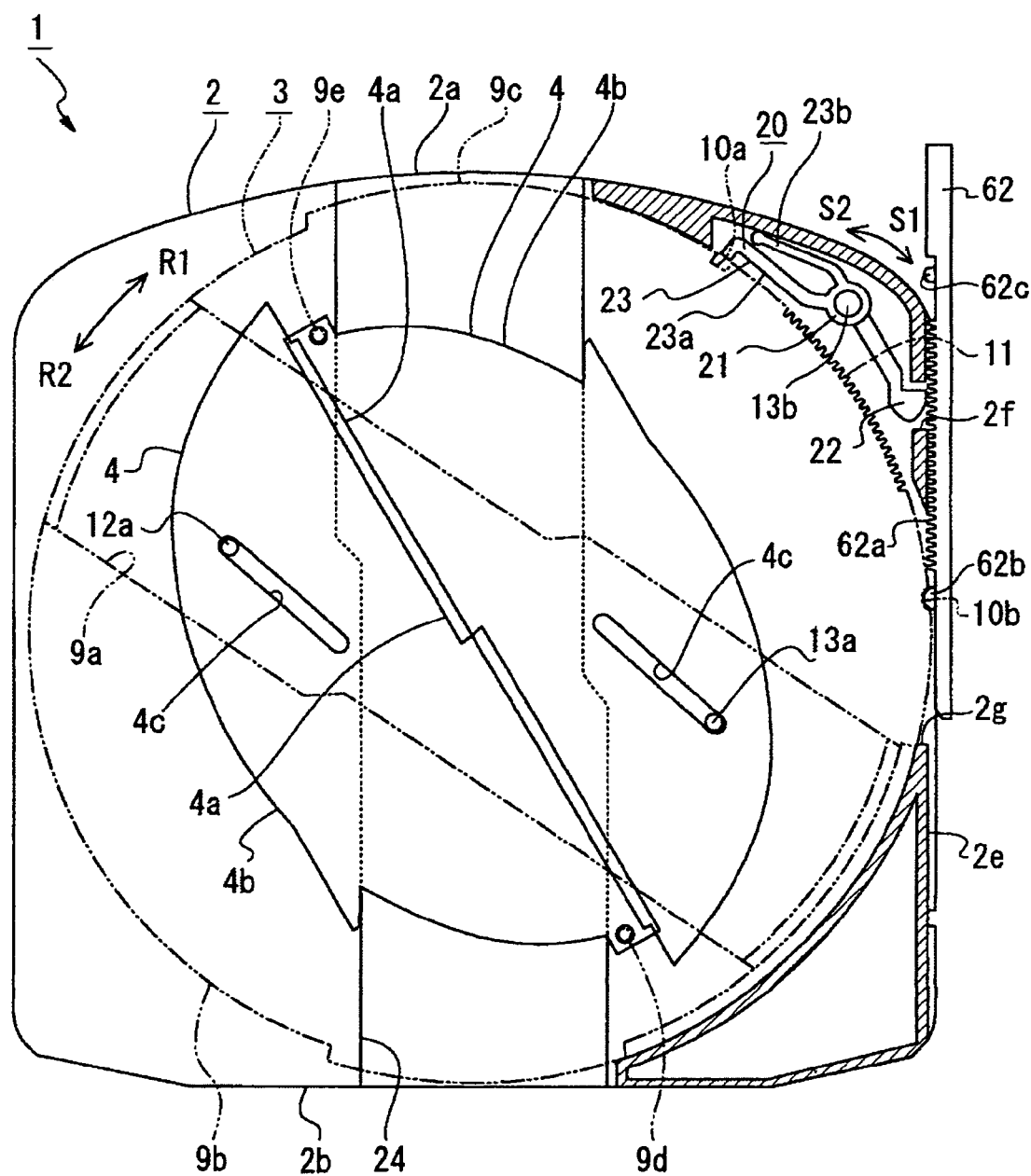
FIG. 17 is a schematic plan view showing a state in which the rack member has been moved and the lock of an inner shell by a lock member has been released with a part of an outer shell being as a cross section continuously to the state shown in FIG. 16.

When the rack member 62 is moved into the L2 direction and the operation protruding portion 62b and the rack 62a are inserted into the insertion groove 2e, the operation protruding portion 22 of the lock member 20 is pressed into the inside of the outer shell 2 by the rack 62a, and at the same time the operation protruding portion 62b is inserted into the engage concave portion 10b of the inner shell 3 to be engaged with the engage concave portion 10b, as shown in FIG. 17.

Figure 12:
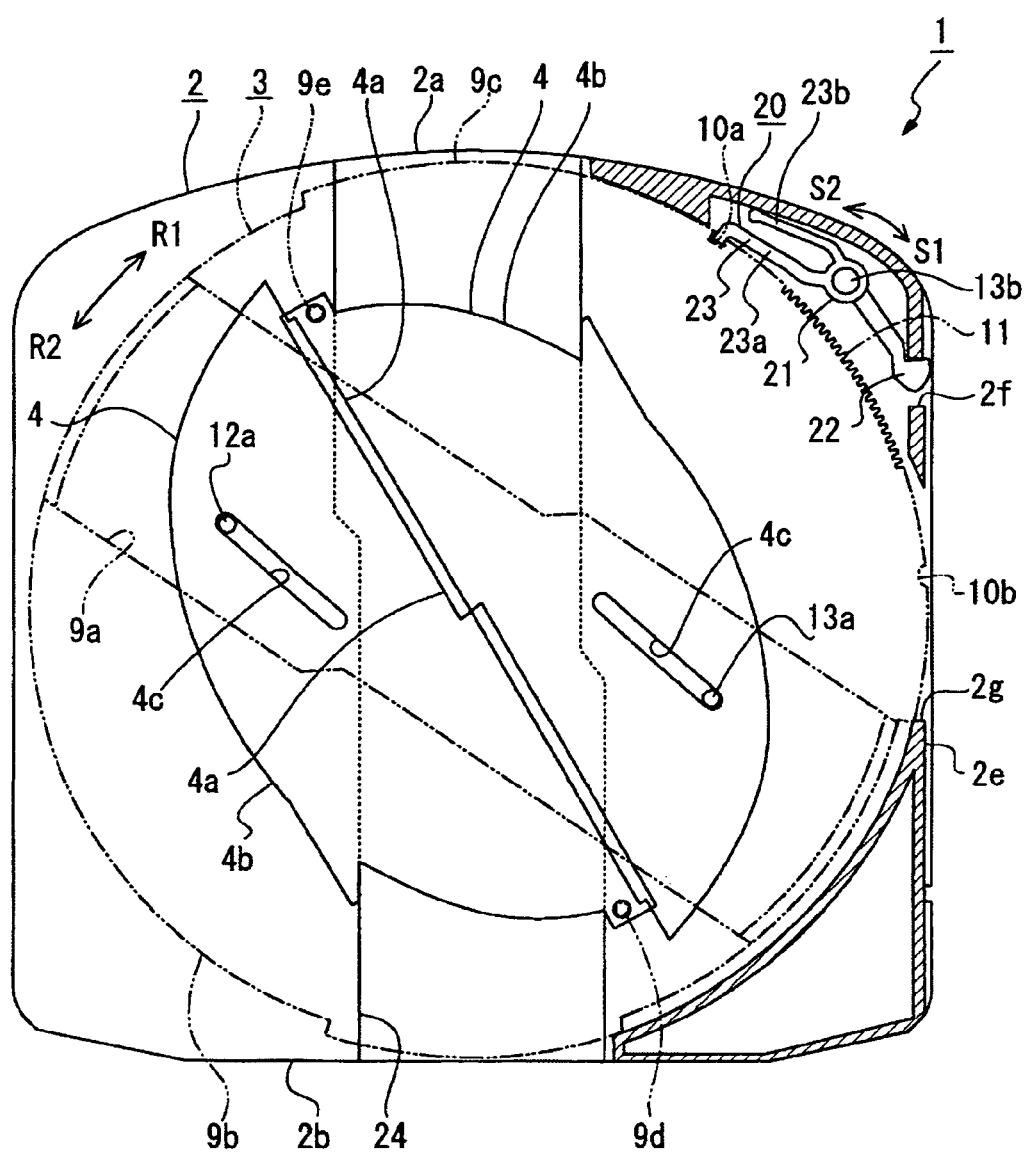
FIG. 12 is a schematic plan view showing a state of the disk cartridge before the disk cartridge is inserted into the insertion opening in an operation of the disk cartridge at the time of being inserted into the insertion opening of the disk drive apparatus, which operation is also shown in FIGS. 13 to 22.

When the operation protruding portion 22 is pressed into the inside of the outer shell 2 by the rack 62a, the lock member 20 is turned into the direction designated by a reference mark S1 shown in FIG. 12. Then, the lock piece portion 23a is separated from the lock concave portion 10a, and thereby the locking of the inner shell 3 with the lock member 20 is released.

Figure 18:
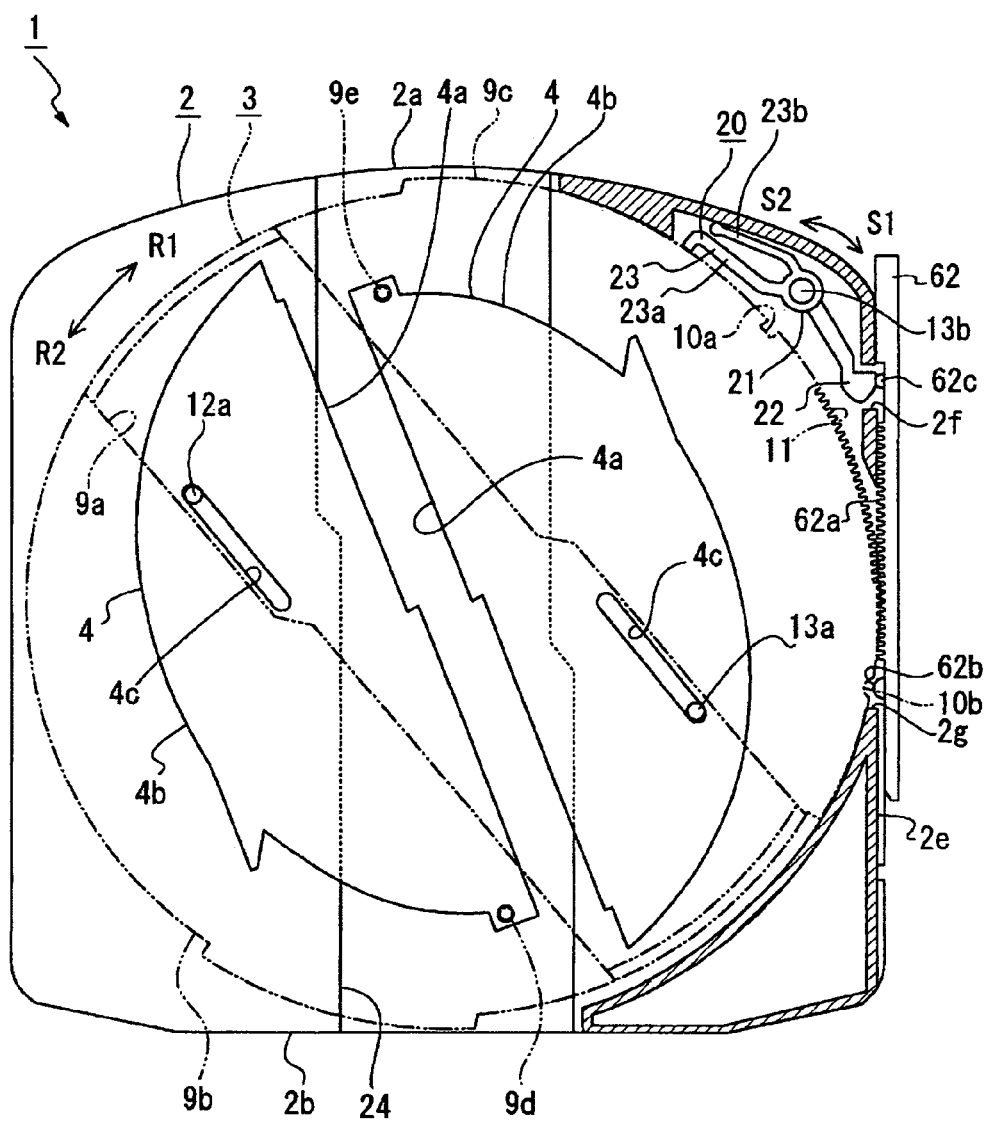
FIG. 18 is a schematic plan view showing a state in which the rack member has been moved and the inner shell has been rotated with a part of the outer shell being as a cross section continuously to the state shown in FIG. 17.

When the rack member 62 is successively moved into the L2 direction, the inner shell 3 is rotated in the direction designated by a reference numeral R1 shown in FIG. 17 as the operation protruding portion 62b moves, and then the rack 62a is engaged with the gear 11 of the inner shell 3 (see FIG. 18). At this time, the shutter members 4 rotates into the R1 direction along with the rotation of the inner shell 3.

When the rack member 62 is further moved into the L2 direction, the engagement of the operation protruding portion 62b with the engage concave portion 10b is released. However, because the rack 62a is engaged with the gear 11, the inner shell 3 accompanies the movement of the rack member 62 to rotate into the R1 direction furthermore. At this time, the guide shafts 12a and 13a move relatively in the guide holes 4c of the shutter members 4, respectively. Then, the shutter members 4 are rotated against the inner shell 3. Consequently, the chord side portions 4a of the shutter members 4 are being separated from each other.

Figure 19:
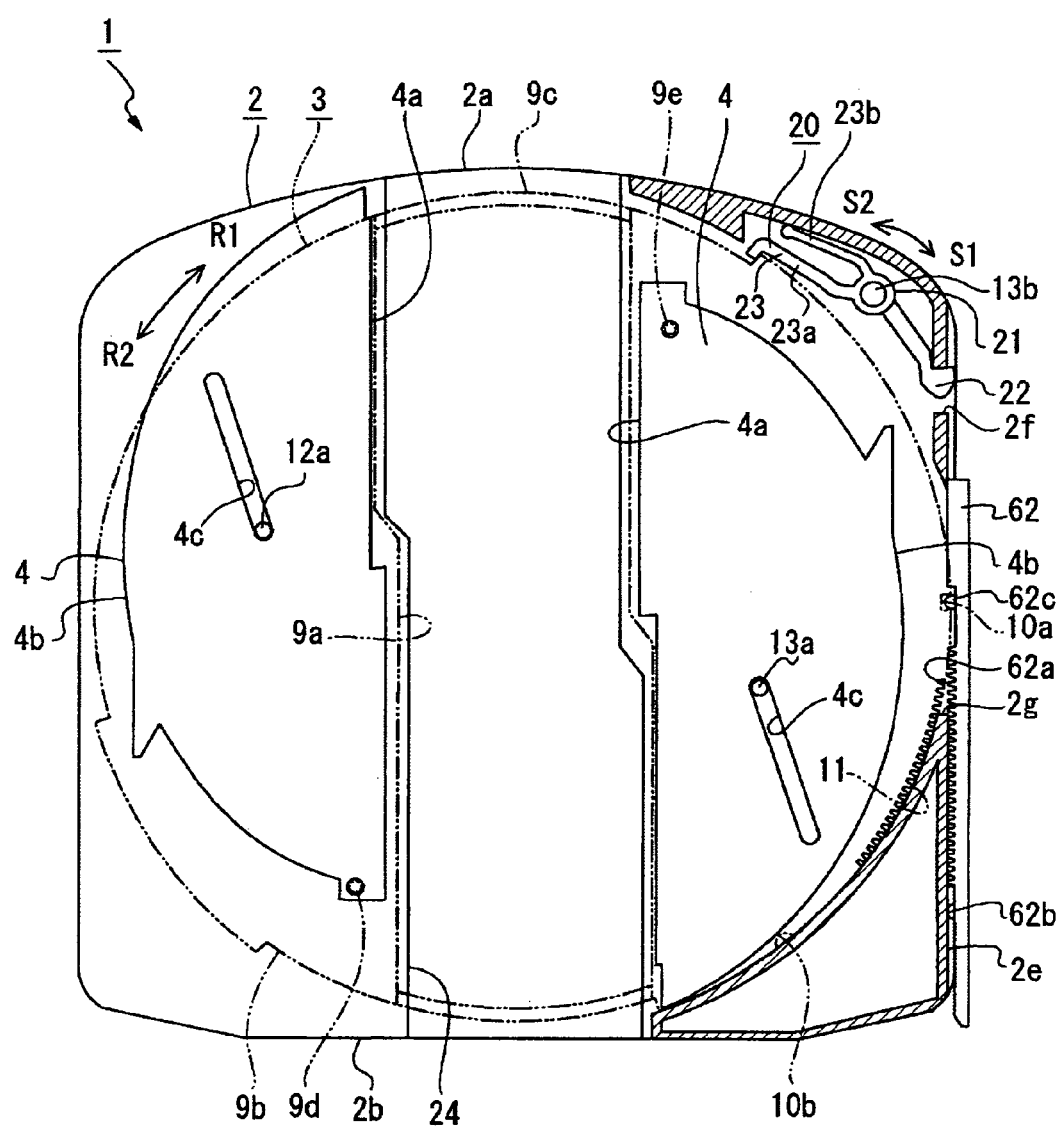
FIG. 19 is a schematic plan view showing a state in which the rack member has been moved and an opening portion has been opened with a part of the outer shell being as a cross section continuously to the state shown in FIG. 18.

Successively, when the rack member 62 is moved into the L2 direction, the lock protruding portion 62c is engaged with the lock concave portion 10a of the inner shell 3, and the movement of the rack member 62 into the L2 direction is stopped (see FIG. 19). In the state in which the movement of the rack member 62 into the L2 direction is stopped, the inner shell 3 reaches a stop position, and the opening cutout 9a coincides with the opening portion 24. At this time, the respective guide shafts 12a and 13a of the second shells 7 and 8 are engaged with the ends of the guide holes 4c on the side of the chord side portions 4a, and the whole of each of the shutter members 4 is positioned between the first part 9b of the inner shell 3 and the second shell 7, and between the second part 9c of the inner shell 3 and the second shell 8. Consequently, the whole of the opening portion 24 is opened and a part of the disk-shaped recording medium 5 is exposed.

When the movement of the rack member 62 into the L2 direction is stopped and the whole of the opening portion 24 is opened, the rotation of the drive gears 56 are again started. When the drive gears 56 are rotated, the cam sliders 57 are again slid in the L1 direction shown in FIG. 15.

Figure 20:
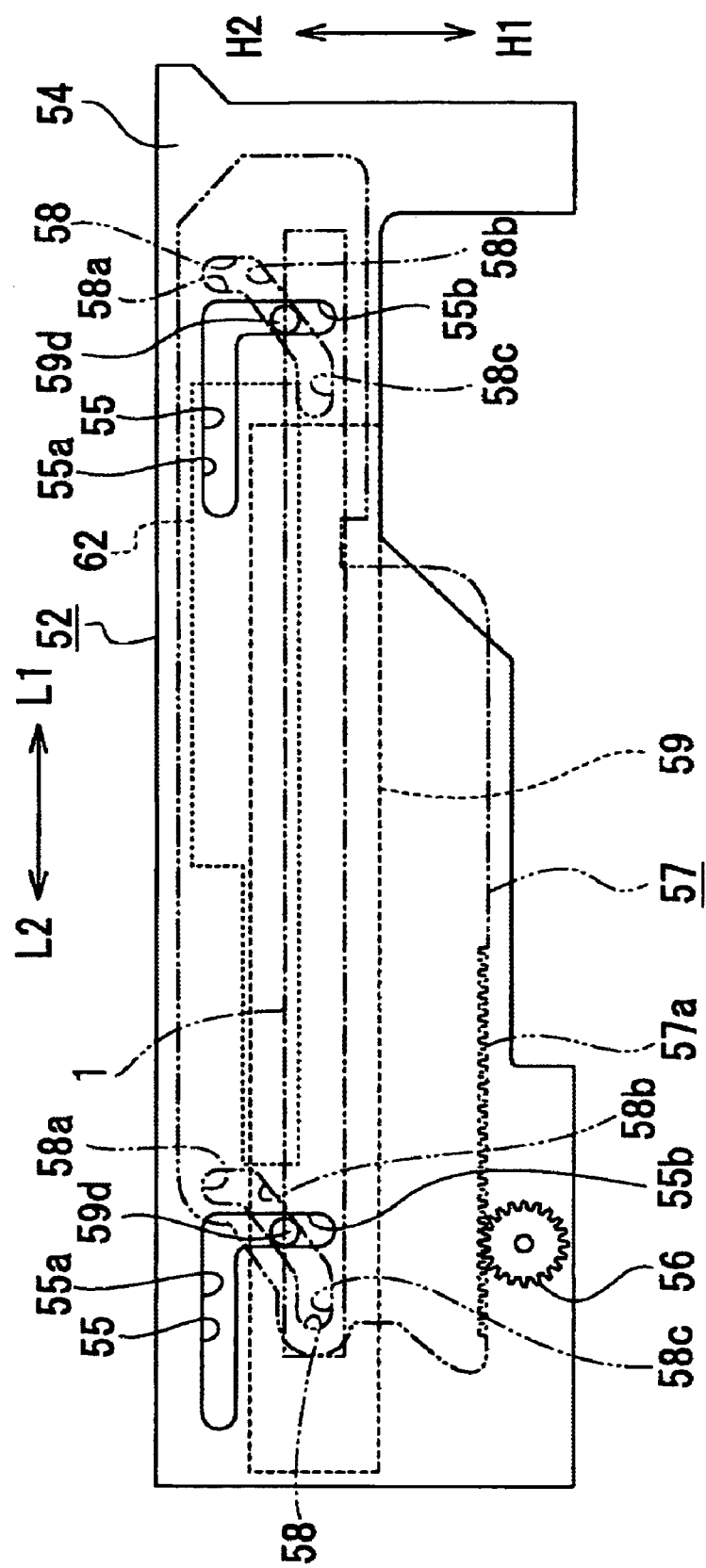
FIG. 20 is a schematic side view showing a state of the descending disk holder.
Figure 21:
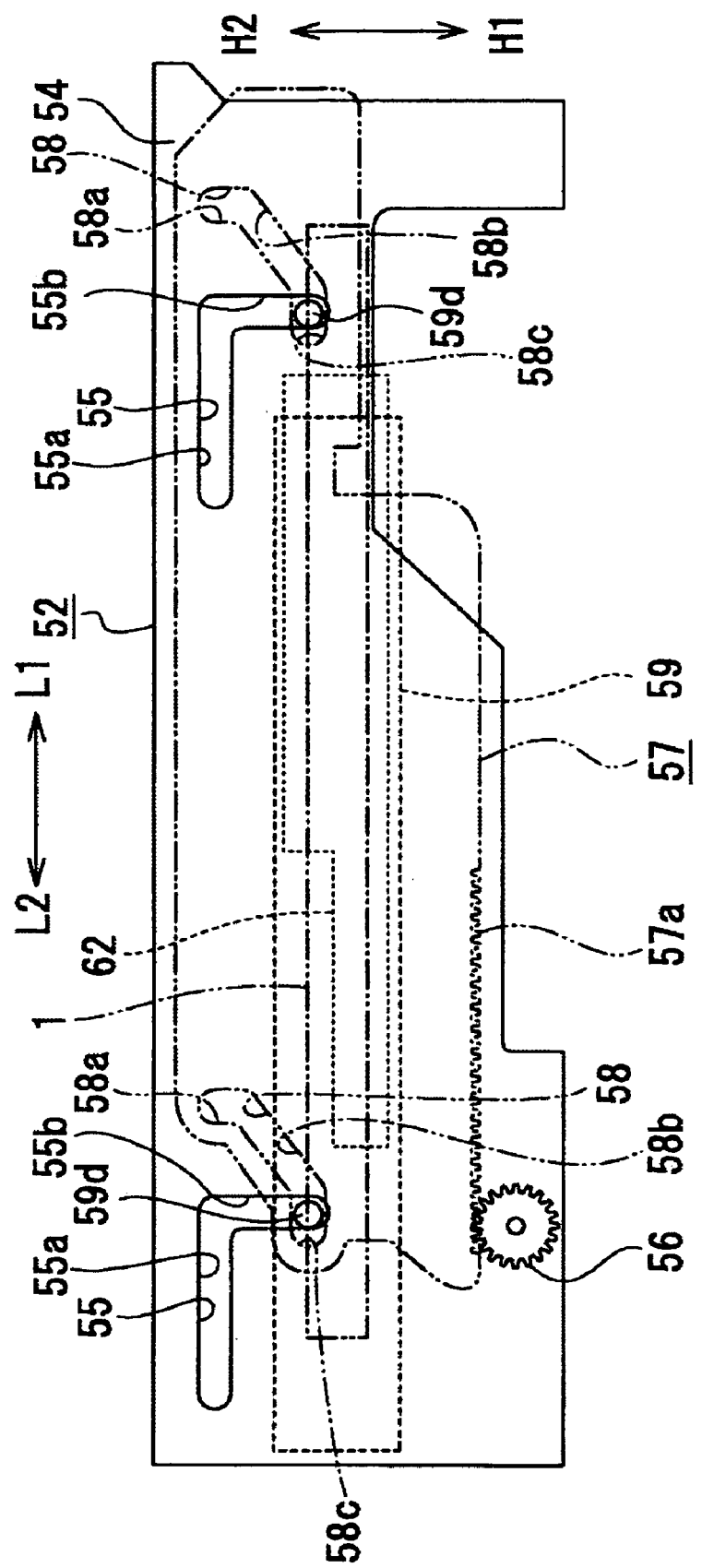
FIG. 21 is a schematic side view showing a state of the disk holder which descends to be moved to a mounting position.
Figure 22:
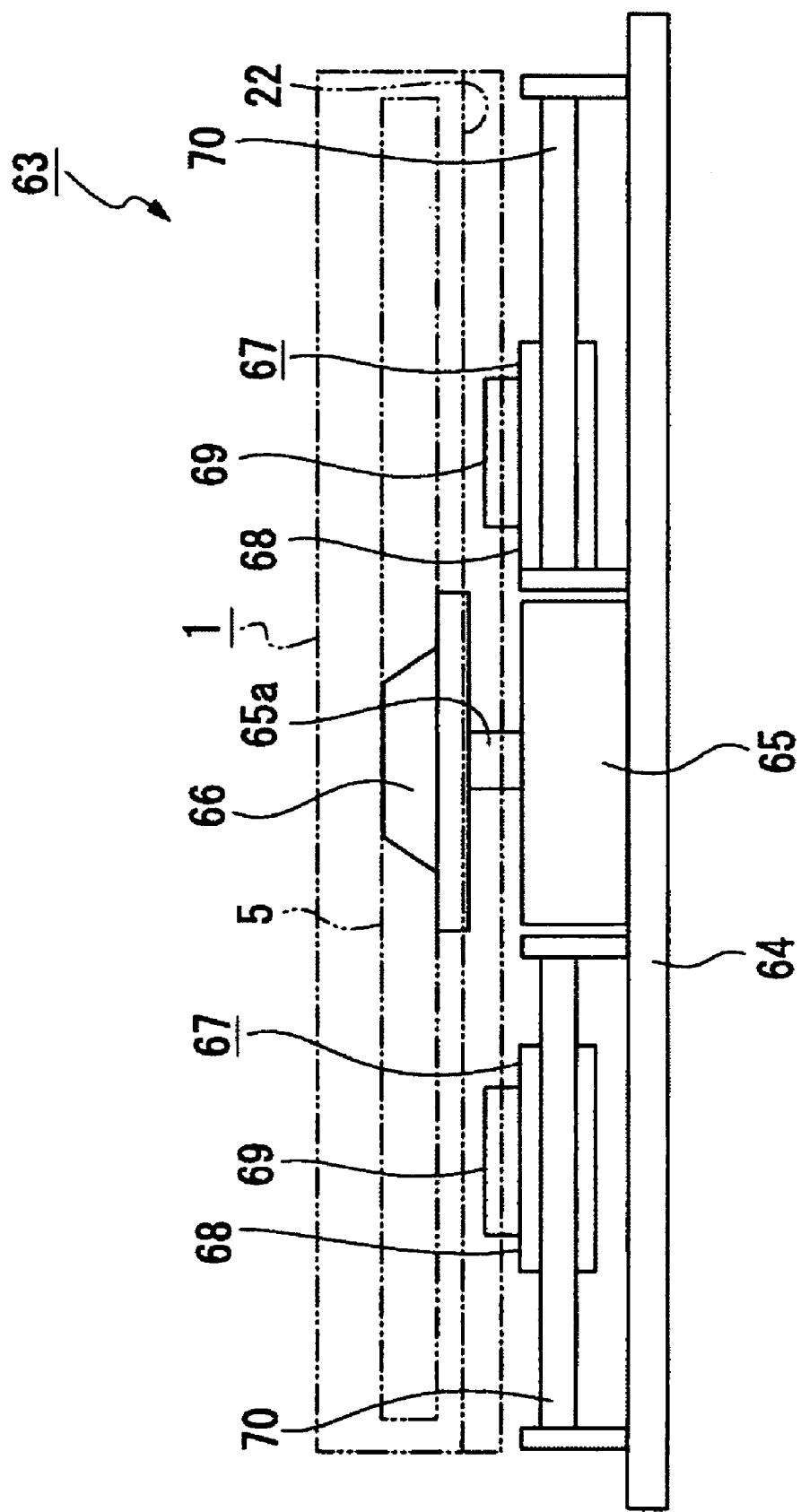
FIG. 22 is a schematic side view showing a state of the disk-shaped recording medium mounted on the disk table.

When the cam sliders 57 are slid into the L1 direction, the guided pins 59d are moved in the vertical portions 55b of the guide holes 55 of the fixed frame 52 and in the cam inclining portions 58b of the cam holes 58 of the cam sliders 57, and the disk holder 59 holding the disk cartridge 1 is moved in an H1 direction (downward) shown in FIG. 15 together with the rack member 62 in one body (see FIG. 20).

Successively, when the cam sliders 57 are slid into the L1 direction and the guided pins 59d reaches the lower ends of the vertical portions 55b and the lower side holding portions 58c of the cam holes 58, the disk holder 59 reaches the mounting position (see FIG. 21), and the rotation of the drive motor is stopped. When the disk holder 59 reaches at the mounting position, the disk table 66 is inserted from the table inserting portion 24a of the opening portion 24 of the outer shell 2 (see FIG. 22). Then, the core 5a of the disk-shaped recording medium 5 is attracted by the magnet of the disk table 66, and the disk-shaped recording medium 5 is mounted on the disk table 66.

In the state in which the disk holder 59 reaches the mounting position, the optical pickups 67 are positioned correspondingly to the first operating portion 24b and the second operating portion 24c of the opening portion 2, respectively.

When the disk-shaped recording medium 5 is mounted on the disk table 66, the disk-shaped recording medium 5 rotates as the disk table 66 rotates, and the recording or the reproducing of an information signal to or from the disk-shaped recording medium 5 is performed by the activation of the optical pickups 67. Incidentally, one or both of the optical pickups 67 are driven in accordance with a request of a user. The driving of both the optical pickups 67 makes it possible to achieve the improvement of a transfer rate and the improvement of the workability of editing work and the like.

When the recording or the reproducing of the information signal is completed, the drive motor is rotated in the opposite direction to that at the preceding time, and then the disk cartridge 1 is ejected in conformity with the operations reverse to those described above. That is, first, the cam sliders 57 are moved into the L2 direction, and the disk holder 59 holding the disk cartridge 1 is moved into the direction designated by a reference mark H2 (upper direction) in one body with the rack member 62. Next, the rack member 62 is moved into the L1 direction, and the inner shell 3 is rotated into an R2 direction. Thereby, the opening portion 24 is closed with the shutter members 4, and then the cam sliders 57 are again moved into the L2 direction. Thus, the disk holder 59 holding the disk cartridge 1 is moved into the L2 direction. At this time, the surface of the disk cartridge 1 on the side of the leading end edge 2*a* is pressed by a not shown pair of ejection levers provided on the disk drive apparatus 50, and then a part of the disk cartridge 1 on the side of the base end edge 2*b* protrudes from the insertion opening 51*a*. The user can take out the disk cartridge 1 from the disk drive apparatus 50 by holding the protruded part to pull out the disk cartridge 1 from the insertion opening 51*a*.

Incidentally, as described above, the disk cartridge 1 is located to the disk drive apparatus 50 by the use of the first positioning portion 16 and the third positioning portion 18. In this case, an area in which each mechanism to be provided in the disk drive apparatus 50 can be arranged is, as shown in FIG. 10, an area E1 except an area on the side of the leading end edge 2*a* of the disk cartridge 1.

Figure 23:
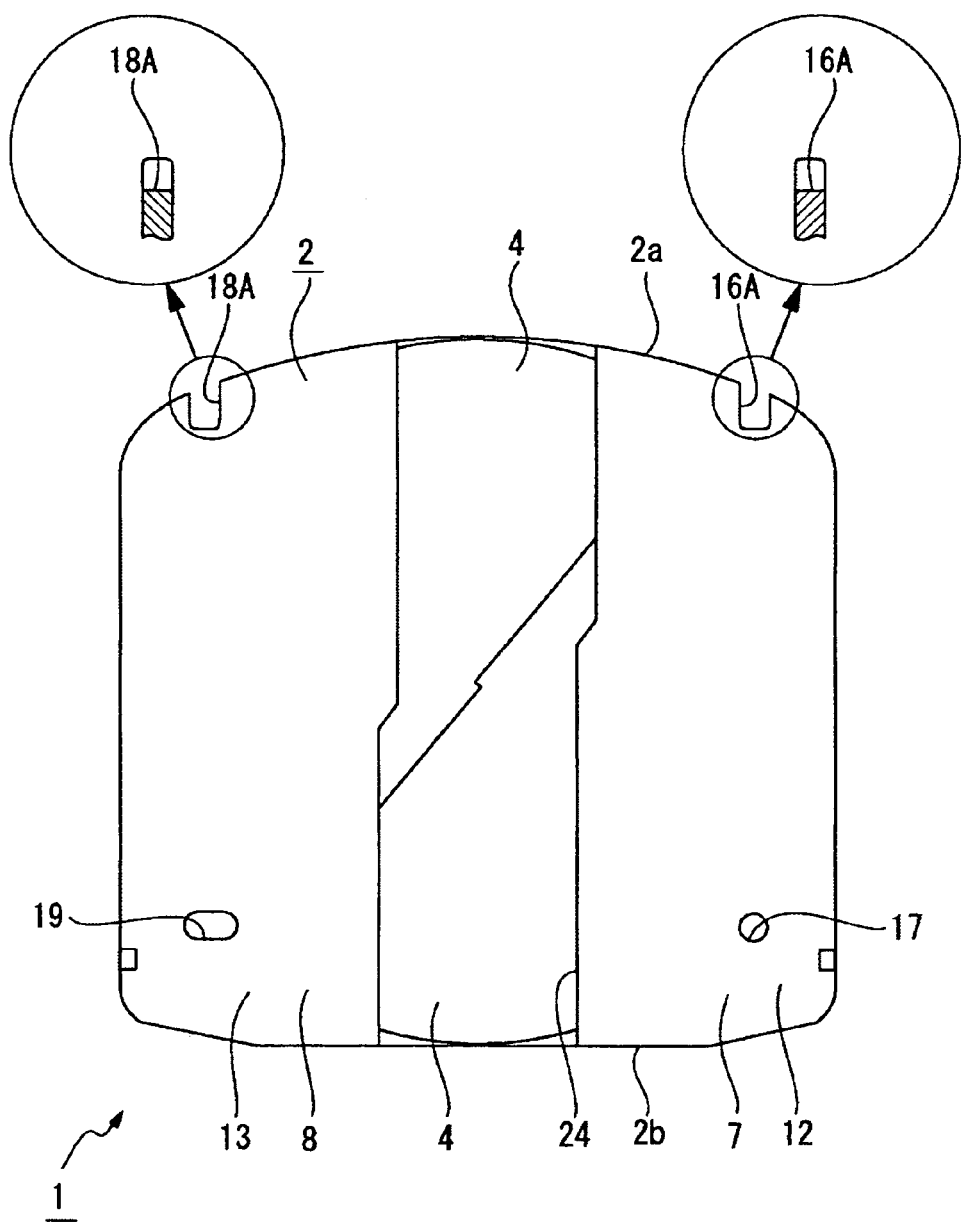
FIG. 23 is a conceptual view showing a disk cartridge including a first positioning portion and a third positioning portion, both opened to an inserting direction and an up and down direction, among other shapes of the positioning portions, which are also shown in FIGS. 24 and 25.
Figure 24:
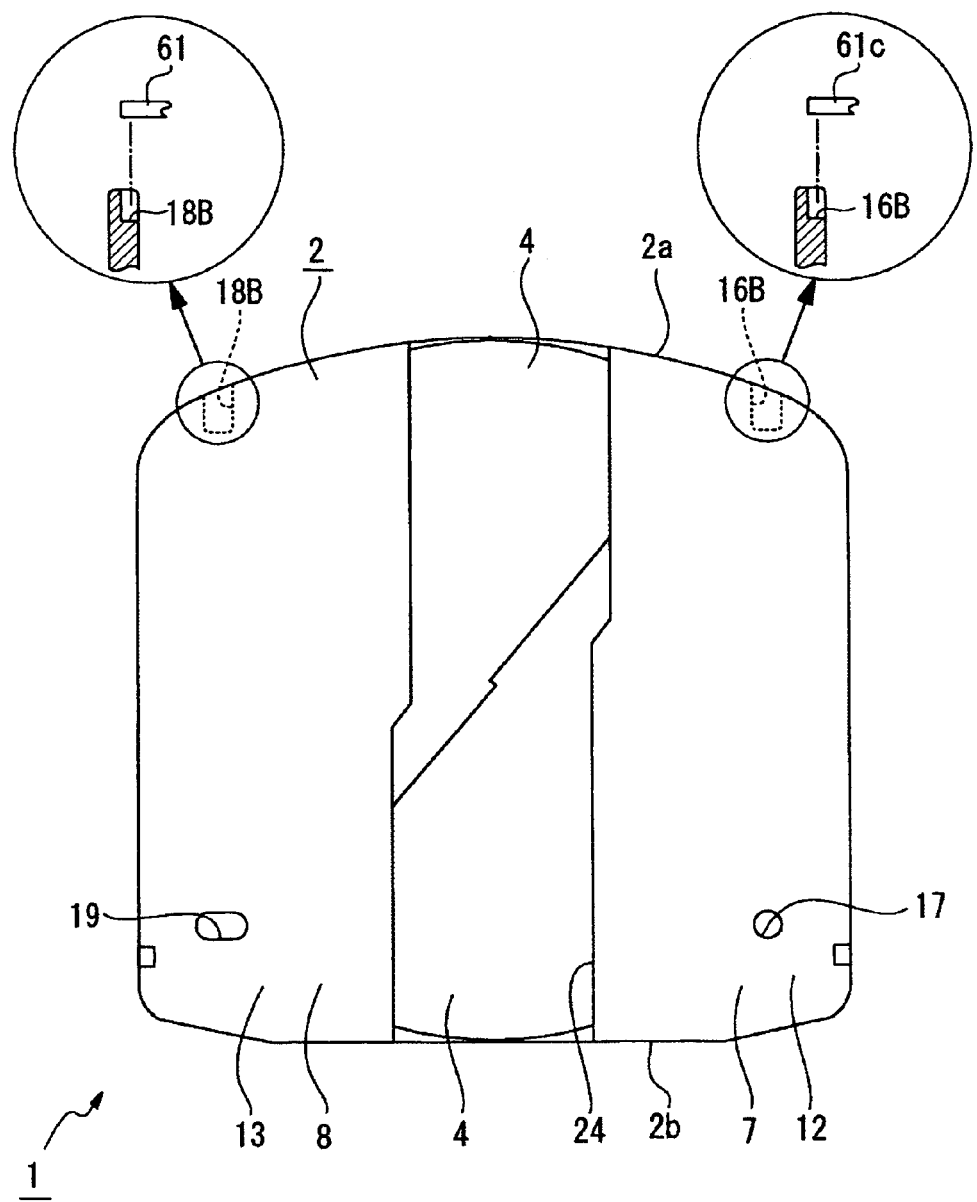
FIG. 24 is a conceptual view of a disk cartridge including positioning portions opened to the inserting direction and an upper direction.
Figure 25:
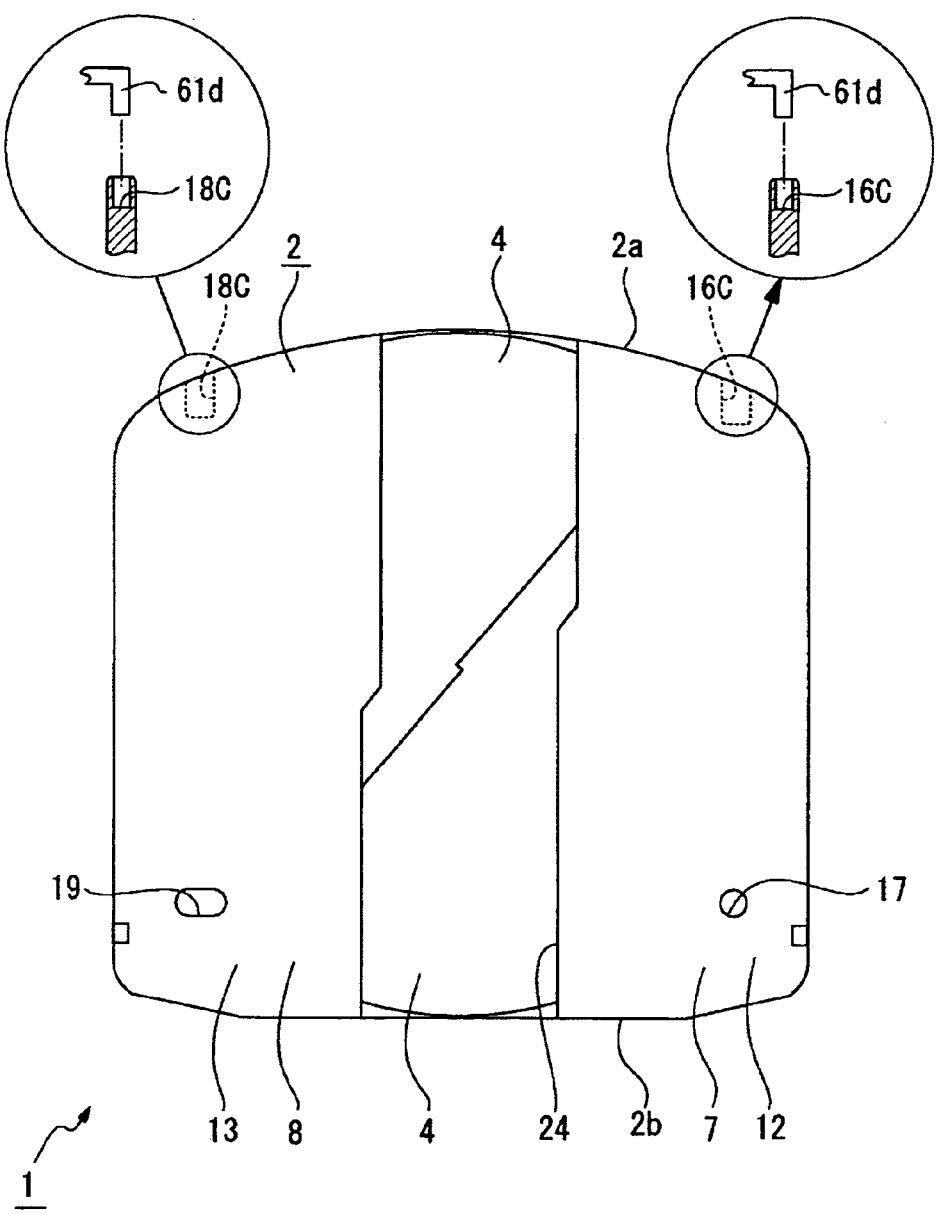
FIG. 25 is a conceptual view of a disk cartridge including positioning portions opened only to the inserting direction.

In the above, the description is given to the disk cartridge 1 having the first positioning portion 16 and the third positioning portion 18, both opened to the down direction and the inserting direction. It is sufficient for the first positioning portion and the third positioning portion to be opened at least to the inserting direction. For example, the first positioning portion and the third positioning portion may be a first positioning portion 16A and a third positioning portion 18A which are opened into the inserting direction and the up and down direction as shown in FIG. 23. The first positioning portion and the third positioning portion may also be a first positioning portion 16B and a third positioning portion 18B which are opened into the inserting direction and the upper direction as shown in FIG. 24. Furthermore, the first positioning portion and the third positioning portion may also be a first positioning portion 16C and a third positioning portion 18C opened only into the inserting direction as shown in FIG. 25. Also in the first positioning portions 16A, 16B and 16C and the third positioning portions 18A, 18B and 18C, it is preferable to form lead portions for the smooth insertion of the positioning pins similarly to the lead portions 16*a* and 18*a* in the first positioning portion 16 and the third positioning portion 18.

In case of the first positioning portion 16B and the third positioning portion 18B, positioning pins 61*c* protruding downward can be provided in the disk drive apparatus 50. In case of the first positioning portion 16C and the third positioning portion 18C, positioning pins 61*d* protruding forward can be provided in the disk drive apparatus 50.

In the above, an example of the positioning of the disk cartridge 1 to the disk drive apparatus 50 by the use of the first positioning portion 16 and the third positioning portion 18 is shown. However, the positioning of the disk cartridge 1 can be performed by using at least two positioning portions among the first positioning portion 16, the second positioning portion 17, the third positioning portion 18 and the fourth positioning portion 19 as follows in addition to the combination of the first positioning portion 16 and the third positioning portion 18.

Figure 26:
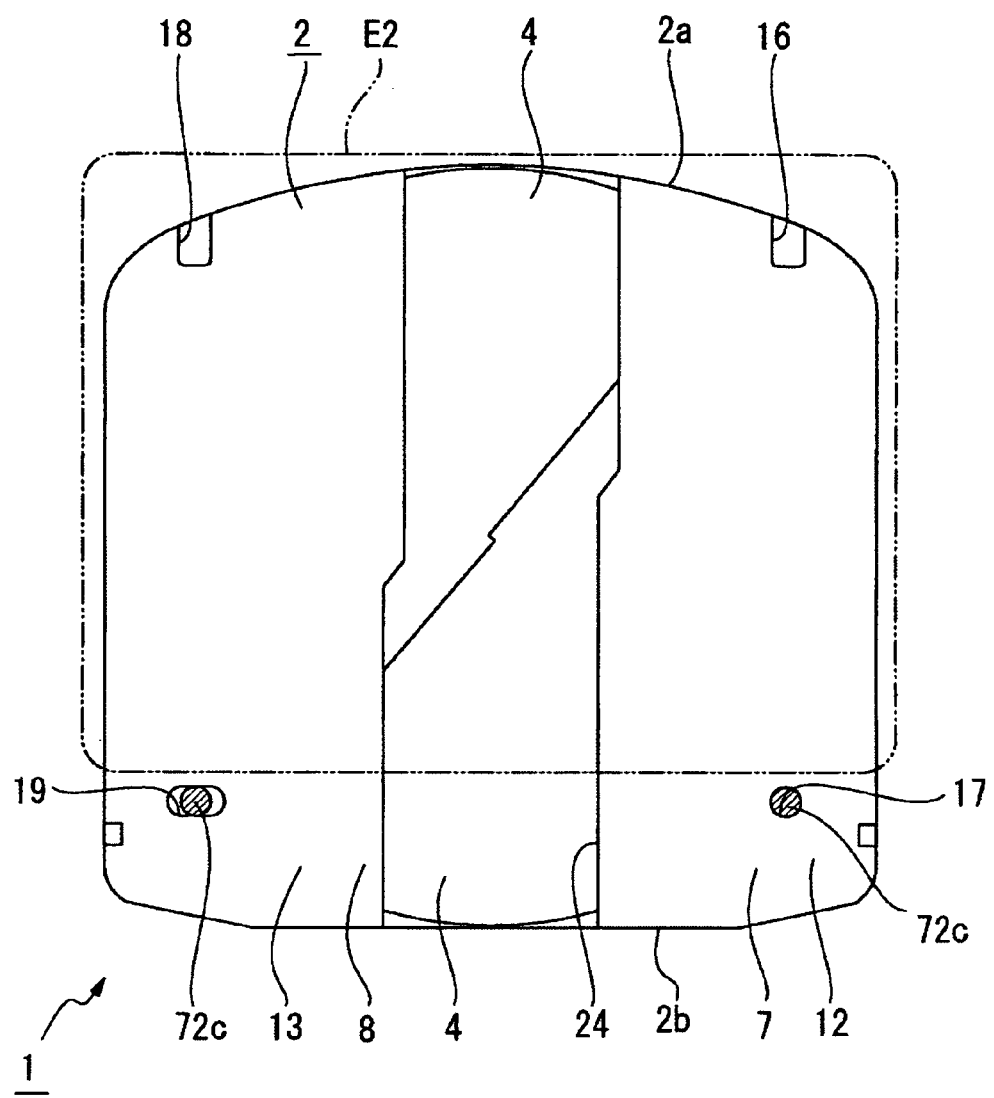
FIG. 26 is a bottom view showing the disk cartridge in a state in which the positioning of the disk cartridge is performed by the use of a second positioning portion and a fourth positioning portion.
Figure 27:
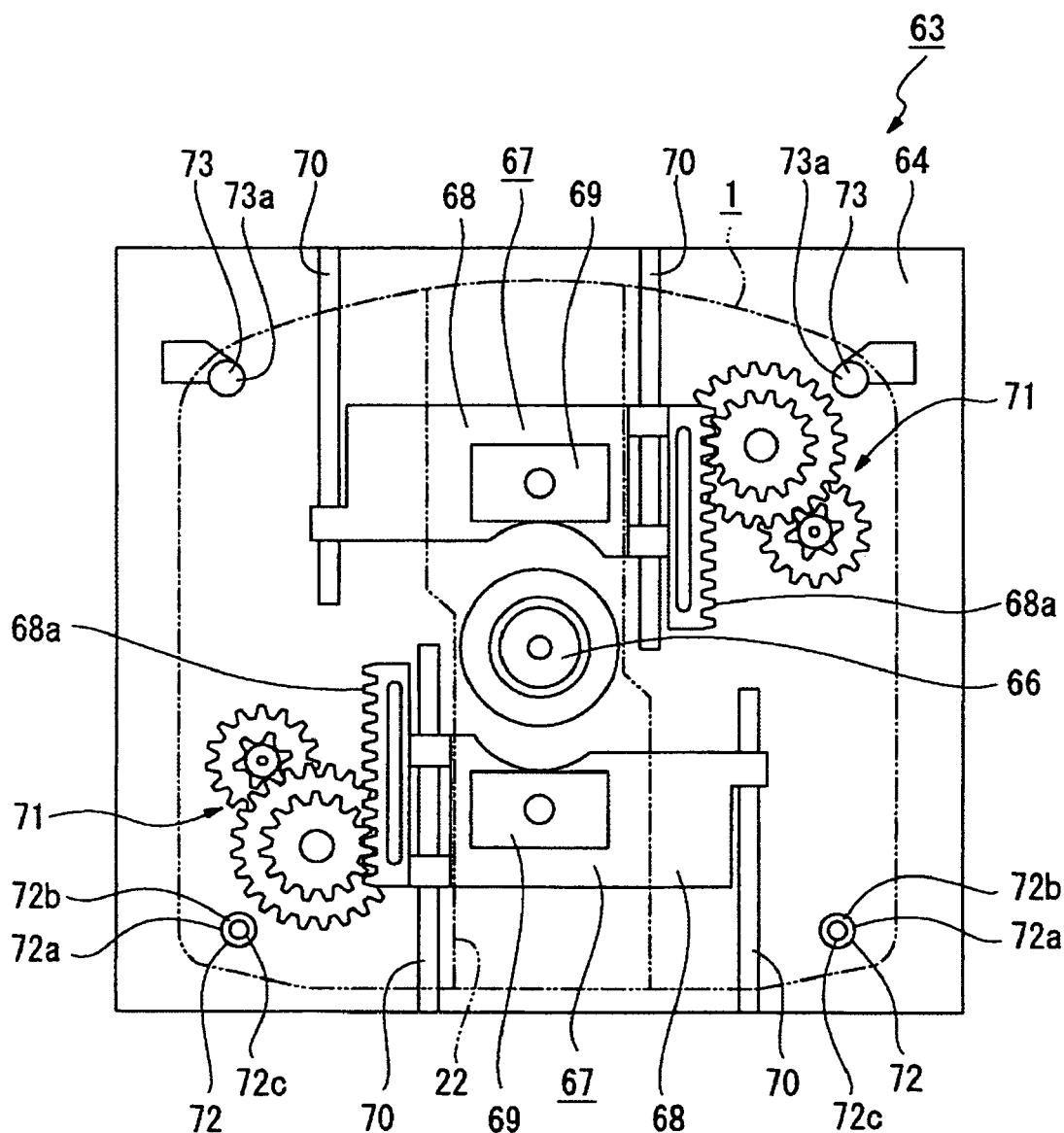
FIG. 27 is a schematic plan view showing the base unit at the time of the positioning thereof using the second positioning portion and the fourth positioning portion.
Figure 28:
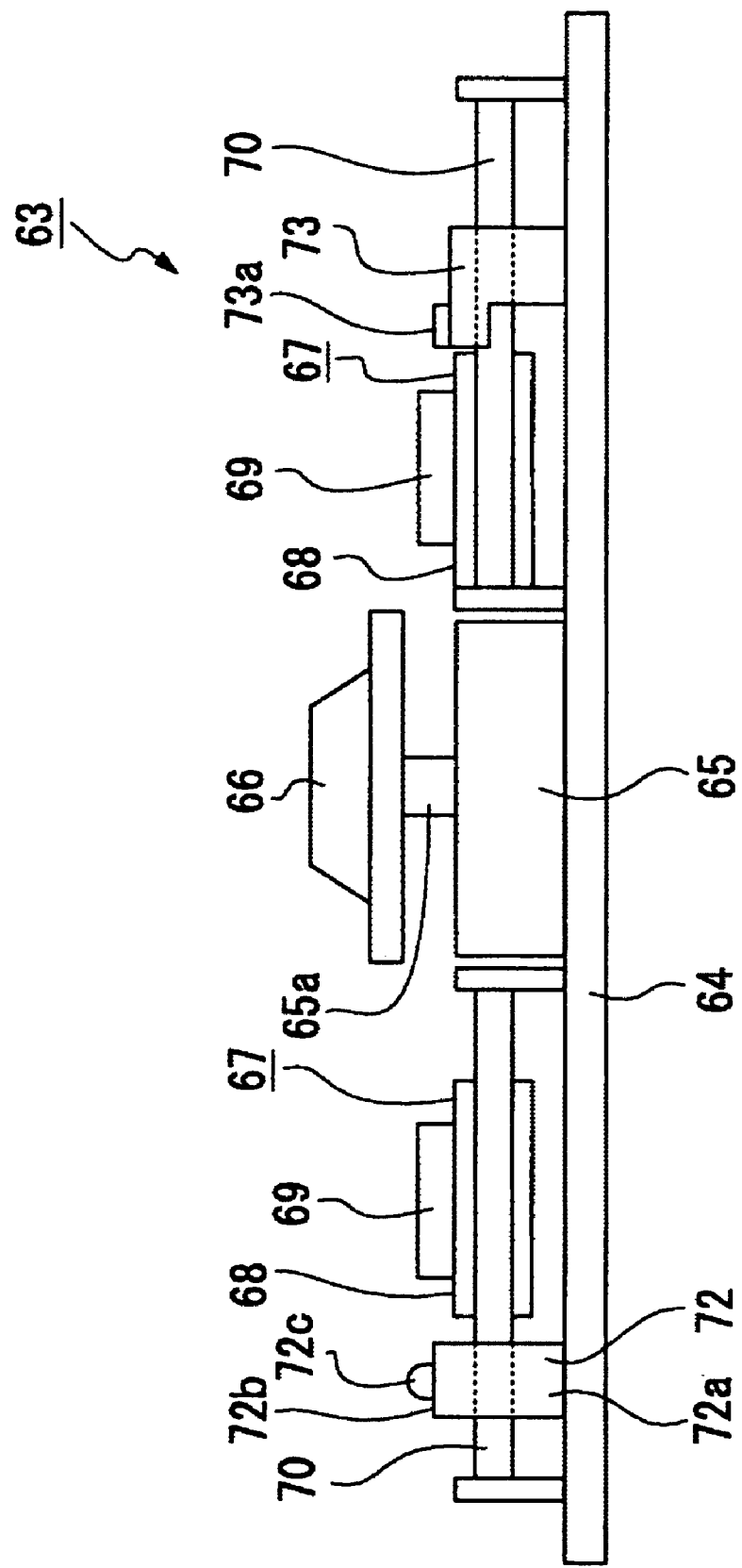
FIG. 28 is a schematic side view showing the base unit at the time of the positioning thereof using the second positioning portion and the fourth positioning portion.

For example, the positioning of the disk cartridge 1 can be performed by using the second positioning portion 17 and the fourth positioning portion 19 (see FIG. 26). In case of the positioning of the disk cartridge 1 using the second positioning portion 17 and the fourth positioning portion 19, for example, positioning portions 72 and receiving portions 73 are formed on the base unit 63 without forming the positioning portions 61 and the receiving pedestal portions 59*e* on the disk holder 59 (see FIGS. 27 and 28).

Each of the positioning portions 72 is composed of a shaft portion 72*a* protruding upward at a position close to the front end of the arranging base 64, and a positioning pin 72*c* protruding at the central part in the top surface 72*b* of the shaft portion 72*a*. The positioning portions 72 are separately positioned at a right position and at a left position.

The receiving portions 73 protrude upward at positions close to the rear end of the arranging base 64. The top surfaces of the receiving portions 73 are formed as receiving surfaces 73*a*. The positions of the receiving surfaces 73*a* in the up and down direction are made to be the same as those of the top surfaces 72*b* of the positioning portions 72 in the up and down direction. The receiving portions 73 are separately positioned at a right position and at a left position.

The positioning of the disk cartridge 1 using the second positioning portion 17 and the fourth positioning portion 19 is performed by means of the respective insertion of the positioning pins 72*c* into the second positioning portion 17 and the fourth positioning portion 19 when the cam sliders 57 are slid into the L1 direction and the disk holder 59 descends up to the mounting position.

The respective insertion of the positioning pins 72*c* into the second positioning portion 17 and the fourth positioning portion 19 locates the disk cartridge 1 in the X, Y direction. Moreover, the pressing of the undersurface of the disk cartridge 1 against the top surfaces 72*b* and the receiving surfaces 73*a* locates the disk cartridge 1 in the height direction (the up and down direction).

In case of the positioning of the disk cartridge 1 to the disk drive apparatus 50 using the second positioning portion 17 and the fourth positioning portion 19, an area in which each mechanism to be provided in the disk drive apparatus 50 can be arranged is, as shown in FIG. 26, an area E2 except an area on the side of the base end edge 2*b* of the disk cartridge 1.

Figure 29:
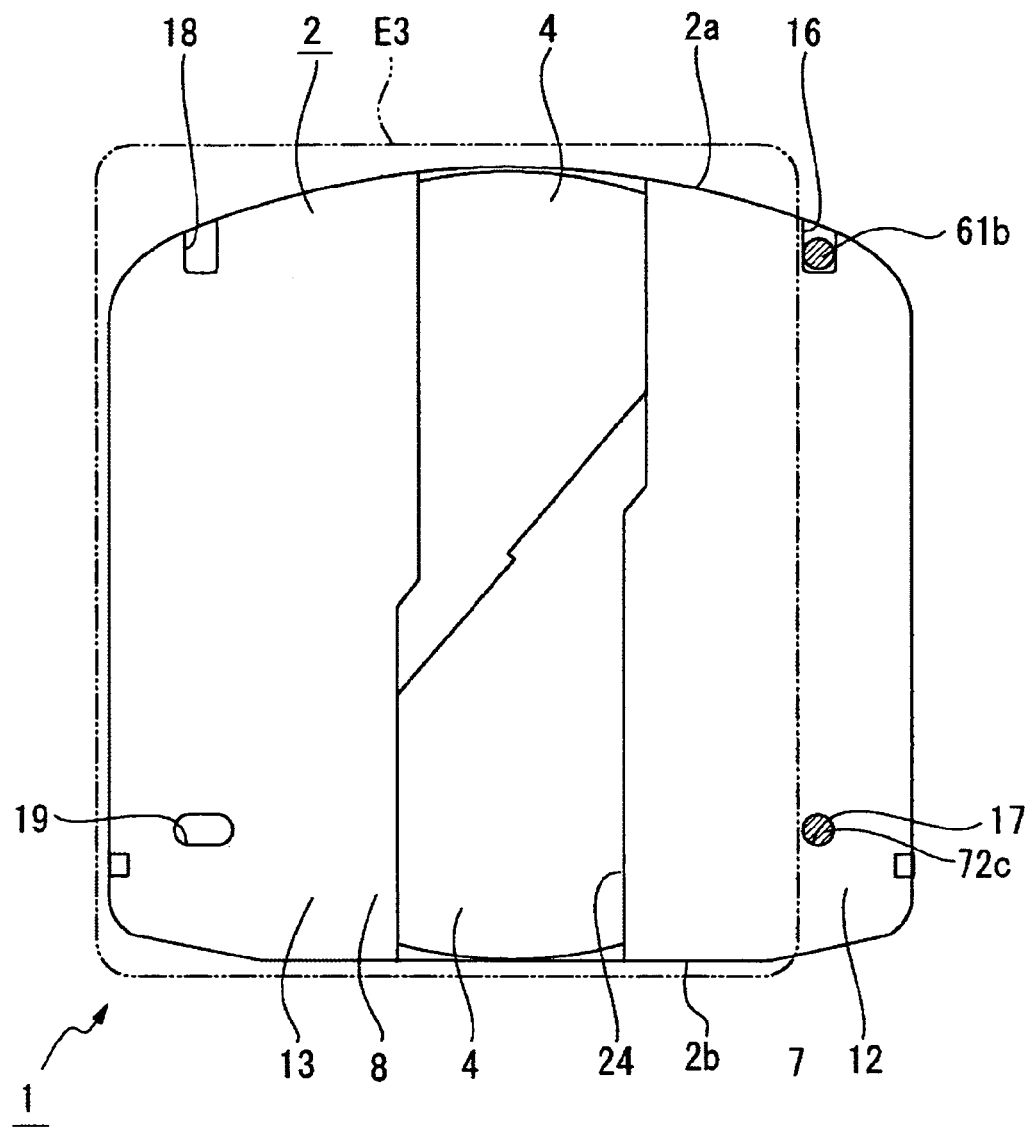
FIG. 29 is a bottom view showing the disk cartridge in a state in which the positioning thereof is performed by the use of the first positioning portion and the second positioning portion.

Moreover, it is possible to locate the disk cartridge 1 by the use of the first positioning portion 16 and the second positioning portion 17 (see FIG. 29). In case of the positioning of the disk cartridge 1 by the use of the first positioning portion 16 and the second positioning portion 17, for example, a positioning portion 61 and a receiving pedestal portion 59*e* is formed on the disk holder 59, and a positioning portion 72 and a receiving portion 73 is formed on the base unit 63.

The positioning of the disk cartridge 1 using the first positioning portion 16 and the second positioning portion 17 is performed by the insertion of the positioning pin 61*b* of the positioning portion 61 into the first positioning portion 16 together with the insertion of the positioning pin 72*c* of the positioning portion 72 into the second positioning portion 17.

The respective insertion of the positioning pin 61*b* and the positioning pin 72*c* into the first positioning portion 16 and the second positioning portion 17 locates the disk cartridge 1 in the X, and Y directions. Moreover, the pressing of the undersurface of the disk cartridge 1 against the receiving pedestal portion 61*a* of the positioning portion 61, the receiving pedestal portion 59*e*, the top surface 72*b* and the receiving surface 73*a* locates the disk cartridge 1 in the height direction (the up and down direction).

In case of the positioning of the disk cartridge 1 to the disk drive apparatus 50 using the first positioning portion 16 and the second positioning portion 17, an area in which each mechanism to be provided in the disk drive apparatus 50 can be arranged is, as shown in FIG. 29, an area E3 except the side edge portion on the side of the first positioning portion 16 and the second positioning portion 17 of the disk cartridge 1.

Figure 30:
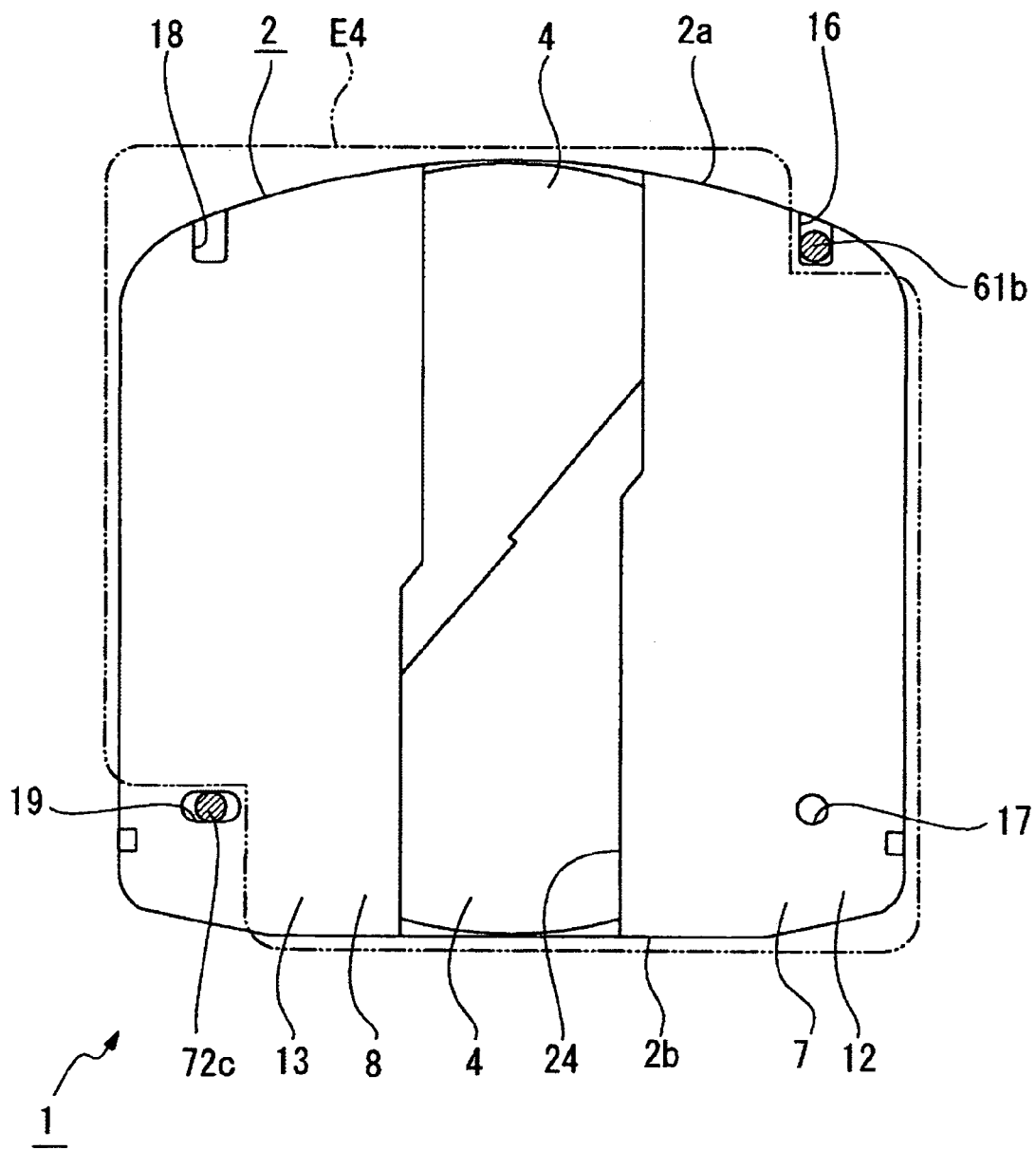
FIG. 30 is a bottom view showing the disk cartridge in a state in which the positioning thereof is performed using the first positioning portion and the fourth positioning portion.

Moreover, the positioning of the disk cartridge 1 can be performed by the use of the first positioning portion 16 and the fourth positioning portion 19 (see FIG. 30). In case of positioning the disk cartridge 1 by the use of the first positioning portion 16 and the fourth positioning portion 19, for example, a positioning portion 61 and a receiving pedestal portion 59e are formed on the disk holder 59, and a positioning portion 72 and a receiving portion 73 are formed on the base unit 63.

The positioning of the disk cartridge 1 using the first positioning portion 16 and the fourth positioning portion 19 is performed by the insertion of the positioning pin 61b of the positioning portion 61 into the first positioning portion 16 together with the insertion of the positioning pin 72c of the positioning portion 72 into the fourth positioning portion 19.

The respective insertion of the positioning pin 61b and the positioning pin 72c into the first positioning portion 16 and the fourth positioning portion 19 locates the disk cartridge 1 in the X, and Y directions. Moreover, the pressing of the undersurface of the disk cartridge 1 against the receiving pedestal portion 61a of the positioning portion 61, the receiving pedestal portion 59e, the top surface 72b and the receiving surface 73a locates the disk cartridge 1 in the height direction (the up and down direction).

In case of the positioning of the disk cartridge 1 to the disk drive apparatus 50 using the first positioning portion 16 and the fourth positioning portion 19, an area in which each mechanism to be provided in the disk drive apparatus 50 can be arranged is, as shown in FIG. 30, an area E4 except the parts corresponding to the first positioning portion 16 and the fourth positioning portion 19 of the disk cartridge 1.

Figure 31:
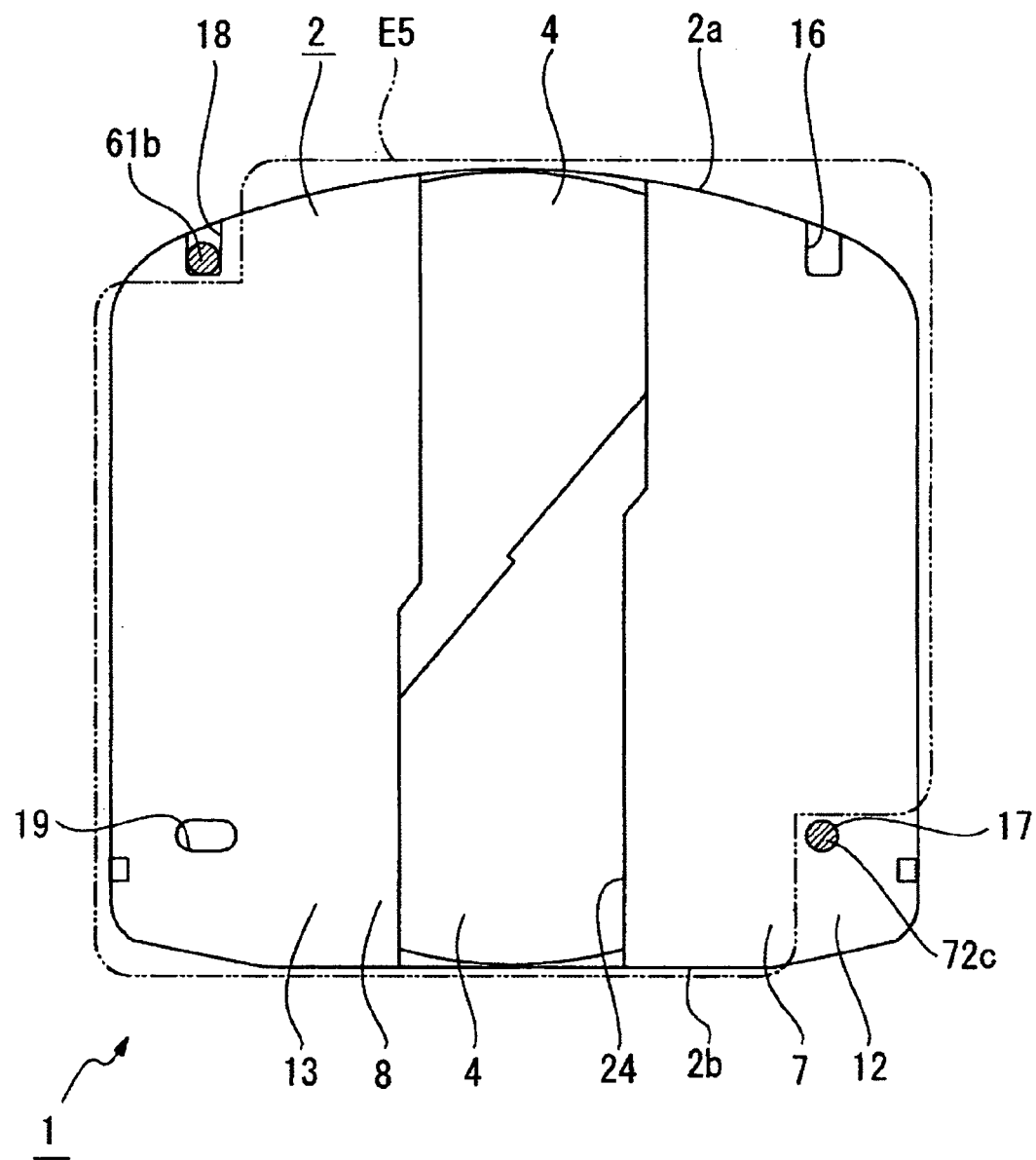
FIG. 31 is a bottom view showing the disk cartridge in a state in which the positioning thereof is performed using the second positioning portion and the third positioning portion.

In addition, the use of the second positioning portion 17 and the third positioning portion 18 makes it possible to locate the disk cartridge 1 (see FIG. 31). In case of the positioning of the disk cartridge 1 using the second positioning portion 17 and the third positioning portion 18, for example, a positioning portion 61 and a receiving pedestal portion 59e are formed on the disk holder 59, and a positioning portion 72 and a receiving portion 73 are formed on the base unit 63.

The positioning of the disk cartridge 1 using the second positioning portion 17 and the third positioning portion 18 is performed by the insertion of the positioning pin 61b of the positioning portion 61 into the third positioning portion 18 together with the insertion of the positioning pin 72c of the positioning portion 72 into the second positioning portion 17.

The respective insertion of the positioning pin 61b and the positioning pin 72c into the third positioning portion 18 and the second positioning portion 17 locates the disk cartridge 1 in the X, and Y directions. Moreover, the pressing of the undersurface of the disk cartridge 1 against the receiving pedestal portion 61a of the positioning portion 61, the receiving pedestal portion 59e, the top surface 72b and the receiving surface 73a locates the disk cartridge 1 in the height direction (the up and down direction).

In case of the positioning of the disk cartridge 1 to the disk drive apparatus 50 using the second positioning portion 17 and the third positioning portion 18, an area in which each mechanism to be provided in the disk drive apparatus 50 can be arranged is, as shown in FIG. 31, an area E5 except the parts corresponding to the second positioning portion 17 and the third positioning portion 18 of the disk cartridge 1.

As described above, the changes of the positioning portions to be used at location select the area in which each mechanism to be provided in the disk drive apparatus 50 can be arranged to be one of the areas E1 to E5. Because the whole of the opening portion 24 is covered in the areas E3 to E5, the areas E3 to E5 are advantages for the disk drive apparatus 50 including two optical pickups 67 in the arrangement of each mechanism.

Incidentally, in the above, the positioning pins 61b, 61c and 61d are exemplified as the means for being inserted into the first positioning portion 16, the second positioning portion 17, the third positioning portion 18 or the fourth positioning portion 19. However, the means for being inserted into the first positioning portion 16, the second positioning portion 17, the third positioning portion 18 or the fourth positioning portion 19 is not limited to the positioning pins 61b, 61c and 61d. For example, an insertion piece formed by cutting a part of the disk holder 59 to raise the cut part, an inserting portion that is made of a resin to be attached to the disk holder 59, or an inserting portion that is made of a resin to be attached to the base unit 63 also can be used in place of the positioning pins 61b, 61c and 61d.

As described above, the four positioning portions of the first positioning portion 16, the second positioning portion 17, the third positioning portion 18 and the fourth positioning portion 19 are formed in the outer shell 2 of the disk cartridge 1, and at least two of the four positioning portions 16 to 19 are used at the positioning of the disc cartridge 1 to the disk drive apparatus 50.

Consequently, the use of at least two positioning portions of the first positioning portion 16, the second positioning portion 17, the third positioning portion 18 and the fourth positioning portion 19 for the positioning of the disk cartridge 1 to the disk drive apparatus 50 increases the degree of freedom of the arrangement positions of the positioning portions to be provided in the disk drive apparatus 50, and makes it possible to increase the degree of freedom in designing the disk drive apparatus 50. Consequently, the simplification of the mechanism of the disk drive apparatus 50 and the miniaturization thereof can be achieved owing to the increase of the degree of the freedom of the design.

Moreover, in the disk cartridge 1, the first positioning portion 16 and the second positioning portion 17 are formed at the same position in the X direction, and the third positioning portion 18 and the fourth positioning portion 19 are formed at the same position different from the position of the first positioning portion 16 and the second positioning portion 17 in the X direction, and further the first positioning portion 16 and the third positioning portion 18 are formed at the same position in the Y direction, and still further the second positioning portion 17 and the fourth positioning portion 19 are formed at the same position different from the position of the first positioning portion 16 and the third positioning portion 18 in the Y direction. Consequently, there is no possibilities that any positional displacements are caused between the first positioning portion 16 and the second positioning portion 17, and between the third positioning portion 18 and the fourth positioning portion 19 owing to dimensional tolerances in the X direction; and there is no possibilities that any positional displacements are caused between the first positioning portion 16 and the third positioning portion 18, and between the second positioning portion 17 and the fourth positioning portion 19 owing to dimensional tolerances in the Y direction. Consequently, the improvement of the positioning accuracy of the disk cartridge 1 can be achieved.

Moreover, in the case where one of the first positioning portion 16 and the third positioning portion 18, both opened toward the inserting direction side, is used as the positioning portion to the disk drive apparatus 50, the positioning of the disk cartridge 1 is performed in a predetermined direction when the disk cartridge 1 is inserted from the insertion opening 51a. Consequently, it is difficult for the opening edge of the second positioning portion 17 or the fourth positioning portion 19 of the disk cartridge 1 to be contacted with the positioning pin 72c at a vertical movement of the disk cartridge 1, and the planing or the like between them owing to the contact can be prevented.

In addition, in the disk cartridge 1, the first positioning portion 16, the second positioning portion 17, the third positioning portion 18 and the fourth positioning portion 19 are opened into the same direction as that of the opening direction of the opening portion 24. Consequently, when at least one of the second positioning portion 17 and the fourth positioning portion 19 is used for the positioning of the disk cartridge 1, the positioning of the disk cartridge 1 to the disk drive apparatus 50 can be performed simultaneously to the insertion of the disk table 66 into the opening portion 24, and the improvement of the efficiency and the speed of the operations of the disk drive apparatus 50 can be achieved.

All of the concrete shapes and the structures of respective portions shown in the embodiment described above are only examples of the materialization for implementing the present invention, and consequently the scope and the sprit of the present invention should not be interpreted to be limited on the basis of those examples.

What is claimed is:

1. A disk cartridge to be inserted into a disk drive apparatus through an insertion opening of the disk drive apparatus upon use, the disk cartridge comprising:
    a shell with at least an opening portion through which a disk table provided in the disk drive apparatus is inserted;
    a disk-shaped recording medium rotatably housed in the shell;
    four positioning holes or four positioning grooves formed on the shell as positioning portions to the disk drive apparatus,
        wherein said four positioning holes or said four positioning grooves are designated as a first positioning portion, a second positioning portion, a third positioning portion and a fourth positioning portion, respectively, and
        wherein when defined that two directions which are perpendicular to a thickness direction of the disk-shaped recording medium are designated as an X direction and a Y direction, and further an inserting direction to the insertion opening and an opposite direction to the inserting direction are designated as the Y direction;
    said first positioning portion and said second positioning portion are formed at a same position in the X direction;
    said third positioning portion and said fourth positioning portion are formed at a same position in the X direction but different from the position of said first positioning portion and said second positioning portion;
    said first positioning portion and said third positioning portion are formed at a same position in the Y direction;
    said second positioning portion and said fourth positioning portion are formed at a same position in the Y direction but different from the position of said first positioning portion and said third positioning portion; and wherein
    at least two of said four positioning portions are used in positioning the disk cartridge to the disk drive apparatus at insertion of the disk cartridge into the disk drive apparatus through the insertion opening.

2. The disk cartridge as cited in claim 1, wherein:
    said first positioning portion and said third positioning portion are positioned on an inserting direction side to said second positioning portion and said fourth positioning portion;
    said first positioning portion and said third positioning portion are opened to at least the inserting direction side; and
    one of said first positioning portion and said third positioning portion is used in positioning the disk cartridge to the disk drive apparatus when the disk cartridge is inserted through the insertion opening.

3. The disk cartridge as cited in claim 1, wherein: p1 said four positioning portions are opened to the same direction as an opening direction of the opening portion of the shell; and
    positioning of the disk cartridge to the disk drive apparatus is performed at a time of a movement of the disk cartridge toward the opening direction of the opening portion.

* * * * *